US012248268B2

(12) United States Patent
Hara et al.

(10) Patent No.: US 12,248,268 B2
(45) Date of Patent: Mar. 11, 2025

(54) DETECTION UNIT FOR OPERATION SOUNDS OF IMAGE FORMING SYSTEM

(71) Applicant: CANON KABUSHIKI KAISHA, Tokyo (JP)

(72) Inventors: Seiji Hara, Shizuoka (JP); Yohei Suzuki, Shizuoka (JP); Hiroshi Hagiwara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/326,844

(22) Filed: May 31, 2023

(65) Prior Publication Data

US 2023/0393515 A1 Dec. 7, 2023

(30) Foreign Application Priority Data

Jun. 2, 2022 (JP) ................................ 2022-090071
Apr. 28, 2023 (JP) ................................ 2023-074228

(51) Int. Cl.
*G03G 15/00* (2006.01)

(52) U.S. Cl.
CPC ......... *G03G 15/55* (2013.01); *G03G 15/5008* (2013.01); *G03G 15/5079* (2013.01); *G03G 2215/00911* (2013.01)

(58) Field of Classification Search
CPC .................... G03G 15/55; G03G 2215/00637
See application file for complete search history.

(56) References Cited

U.S. PATENT DOCUMENTS 11,360,420 B2 6/2022 Hara et al.
2007/0070456 A1 3/2007 Nishimura
2009/0097870 A1 4/2009 Misumi et al.
2009/0285601 A1* 11/2009 Akamatsu .......... G03G 15/0194 399/167
2016/0112602 A1* 4/2016 Kawai ................ H04N 1/00029 358/1.14
2020/0209795 A1 7/2020 Okumura
(Continued)

FOREIGN PATENT DOCUMENTS

CN 1700116 A 11/2005
CN 101154067 A 4/2008
CN 101414151 A 4/2009
(Continued)

*Primary Examiner* — Jessica L Eley
(74) *Attorney, Agent, or Firm* — Canon U.S.A., Inc. I.P. Division

(57) ABSTRACT

An image forming system includes an image forming unit, a plurality of drive units configured to drive the image forming unit, a sound detection unit configured to detect operation sounds of the plurality of drive units, and a control unit configured to implement a drive mode for operating at least one of the plurality of drive units and not operating other drive units, without forming an image on a recording material by the image forming unit, wherein the control unit implements the drive mode when the value of a counter reaches a threshold value, the counter being incremented with each image formation on a recording material by the image forming unit, and wherein the identification operation identifies a component causing the predetermined sound based on the operation sounds detected by the sound detection unit during a period in which the drive mode is being implemented.

14 Claims, 16 Drawing Sheets

(56) References Cited

U.S. PATENT DOCUMENTS

2020/0324990 A1 * 10/2020 Ogino ...................... B65H 7/06

FOREIGN PATENT DOCUMENTS

| | | | |
|---|---|---|---|
| JP | 2003083801 | A | 3/2003 |
| JP | 2006208074 | A | 8/2006 |
| JP | 4863802 | B2 | 1/2012 |
| JP | 2019116007 | A | 7/2019 |
| JP | 2019197153 | A | 11/2019 |
| JP | 2020194290 | A | 12/2020 |
| JP | 2021166353 | A | 10/2021 |

* cited by examiner

FIG.6

| PROLONGED DRIVE MODE NO. | DRIVE SOURCE | FILTER |
|---|---|---|
| 1 | SHEET FEEDING MOTOR | THROUGH |
| 2 | FIXING MOTOR | THROUGH |
| 3 | DEVELOPING MOTOR | THROUGH |
| 4 | SHEET FEEDING MOTOR | LOW FREQUENCY |
| 5 | FIXING MOTOR | LOW FREQUENCY |
| 6 | DEVELOPING MOTOR | LOW FREQUENCY |
| 7 | SHEET FEEDING MOTOR | HIGH FREQUENCY |
| 8 | FIXING MOTOR | HIGH FREQUENCY |
| 9 | DEVELOPING MOTOR | HIGH FREQUENCY |

FIG.11

| PROLONGED DRIVE MODE NO. | DRIVE SOURCE | FILTER |
|---|---|---|
| 1 | SHEET FEEDING MOTOR | THROUGH |
| 2 | FIXING MOTOR | THROUGH |
| 3 | DEVELOPING MOTOR | THROUGH |
| 4 (= 2) | FIXING MOTOR | THROUGH |
| 5 | SHEET FEEDING MOTOR | LOW FREQUENCY |
| 6 | FIXING MOTOR | LOW FREQUENCY |
| 7 | DEVELOPING MOTOR | LOW FREQUENCY |
| 8 (= 6) | FIXING MOTOR | LOW FREQUENCY |
| 9 | SHEET FEEDING MOTOR | HIGH FREQUENCY |
| 10 | FIXING MOTOR | HIGH FREQUENCY |
| 11 | DEVELOPING MOTOR | HIGH FREQUENCY |
| 12 (= 10) | FIXING MOTOR | HIGH FREQUENCY |

FIG.13

| PRINTED PAGE | | 1 | 2 | 3 | 4 | 5 | 6 | ... |
|---|---|---|---|---|---|---|---|---|
| SHEET FEEDING PORT | | CASSETTE 2 | CASSETTE 2 | CASSETTE 51 | CASSETTE 2 | CASSETTE 51 | CASSETTE 51 | ... |
| TOTAL NUMBER OF PRINTED SHEETS | FIXING MOTOR | 1 | 2 | 3 | 4 | 5 | 6 | ... |
| | DEVELOPING MOTOR | 1 | 2 | 3 | 4 | 5 | 6 | ... |
| | SHEET FEEDING MOTOR | 1 | 2 | 3 | 4 | 5 | 6 | ... |
| | OP FEEDING MOTOR | 0 | 0 | 1 | 1 | 2 | 3 | ... |

DETECTION UNIT FOR OPERATION SOUNDS OF IMAGE FORMING SYSTEM

BACKGROUND

Field

The present invention relates to an image forming system having a detection unit for detecting operation sounds of a plurality of drive units.

Description of the Related Art

In image forming apparatuses such as copying machines and laser beam printers, a component kept being used after the lifetime expiration may generate an abnormal sound. Japanese Patent No. 4863802 discusses a technique for detecting a sound generated in an image forming apparatus and analyzing the detected sound by using an analysis unit to identify a component generating an abnormal sound.

The technique discussed in Japanese Patent No. 4863802 analyzes the frequency of the detected sound to identify the component generating the abnormal sound based on the frequency and the peak value of the sound pressure level at the frequency. However, if the image forming apparatus includes a plurality of drive sources, these drive sources often concurrently operate, and frequency bands of the drive sources often overlap. Therefore, it may be difficult to identify a component generating an abnormal sound based only on the frequency and the peak value of the sound pressure level of the detected sound.

SUMMARY

The present disclosure is directed to improving the accuracy of identifying a component generating an abnormal sound.

According to an aspect of the present disclosure, an image forming system that performs an identification operation for identifying a component causing a predetermined sound, the image forming system includes: an image forming unit configured to form an image on a recording material, a plurality of drive units configured to drive the image forming unit, a sound detection unit configured to detect operation sounds of the plurality of drive units, and a control unit configured to implement a drive mode for operating at least one of the plurality of drive units and not operating other drive units, without forming an image on a recording material by the image forming unit, wherein the control unit implements the drive mode when the value of a counter reaches a threshold value, the counter being incremented with each image formation on a recording material by the image forming unit, and wherein the identification operation identifies a component causing the predetermined sound based on the operation sounds detected by the sound detection unit during a period in which the drive mode is being implemented.

Further features of the present disclosure will become apparent from the following description of exemplary embodiments with reference to the attached drawings.

BRIEF DESCRIPTION OF THE DRAWINGS

FIG. 6 is a table illustrating motors and filters that implement individual drive according to the first exemplary embodiment.

FIG. 11 is a table illustrating motors and filters that implement individual drive according to the second exemplary embodiment.

FIG. 13 is a table used to count the numbers of operations of drive sources according to third exemplary embodiment.

DESCRIPTION OF THE EMBODIMENTS

Exemplary embodiments of the present disclosure will be illustratively described in detail below with reference to the accompanying drawings. However, sizes, materials, shapes, and relative arrangements of components according to the following exemplary embodiments are to be modified as required depending on the configuration of an apparatus according to the present disclosure and other various conditions. Therefore, unless otherwise specifically described, the scope of the present disclosure is not limited to the following exemplary embodiments.

[Descriptions of Image Forming Apparatus]

Figure 1:
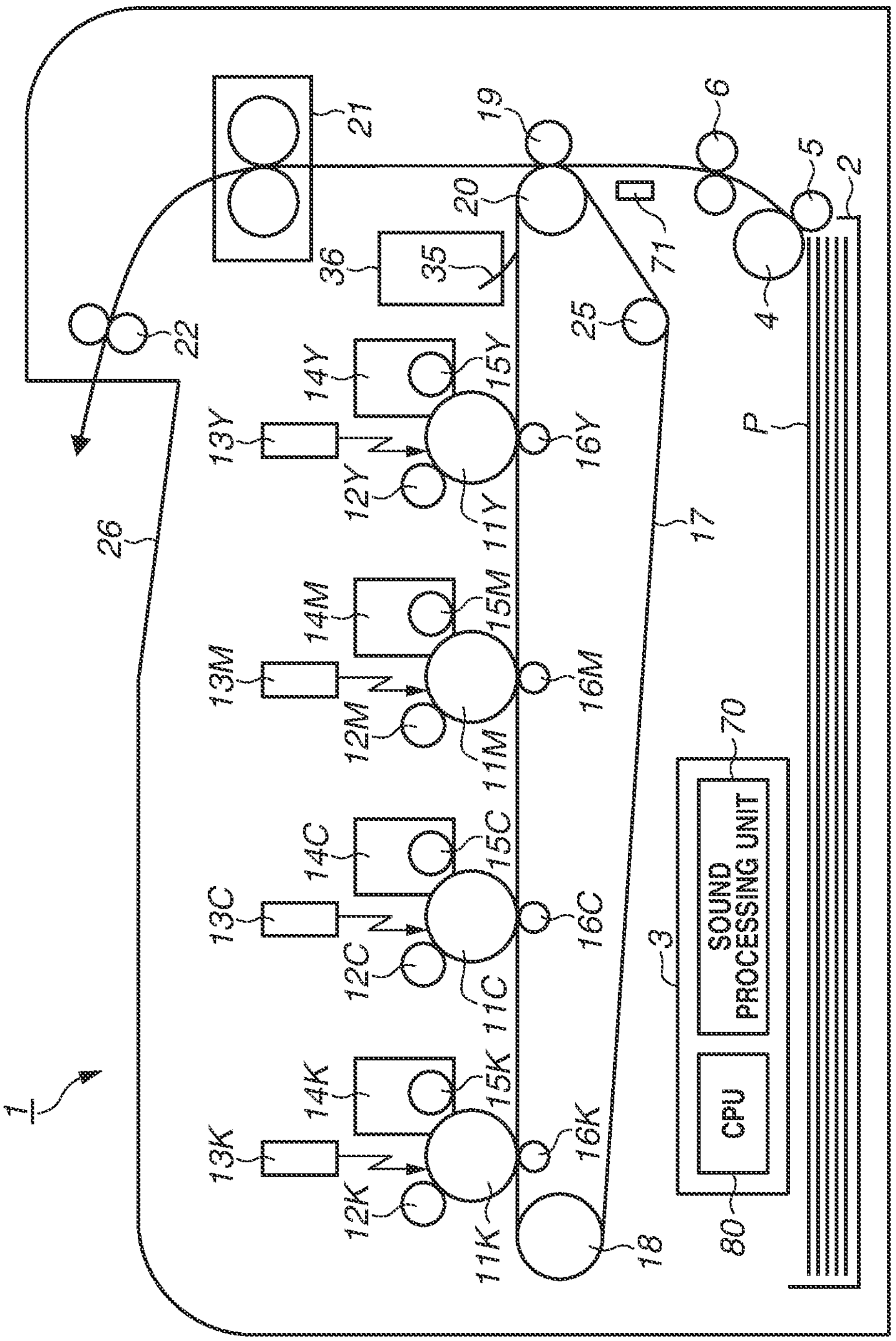
FIG. 1 is a cross-sectional view illustrating an overview of an image forming apparatus according to a first exemplary embodiment.

A first exemplary embodiment will be described below. An image forming apparatus having an abnormal sound diagnostic apparatus will be described below with reference to the accompanying drawings. An electrophotographic color image forming apparatus will be described below as an example of an apparatus having an abnormal sound diagnostic apparatus. FIG. 1 illustrates a configuration of a tandem type color image forming apparatus having an intermediate transfer belt as an example of an electrophotographic color image forming apparatus.

Components of an image forming apparatus 1 in FIG. 1 will be described below. A feeding cassette 2 stores recording materials P. A control unit 3 controls image forming operations of the image forming apparatus 1. When power of an electromagnetic clutch (not illustrated) is turned ON, the rotation of a motor (not illustrated) is transmitted to rotate a feed roller 4 in the counterclockwise direction in FIG. 1, to feed the recording materials P from the feeding cassette 2. When the feed roller 4 feeds the recording materials P from the feeding cassette 2, a separation roller 5 separates the recording materials P one by one and then feeds each material P. A conveyance roller pair 6 as a conveyance unit conveys the fed recording material P. After the recording material P is conveyed by the conveyance roller pair 6, power of the electromagnetic clutch is turned OFF and the drive transmission to the feed roller 4 is canceled.

Photosensitive drums 11Y, 11M, 11C, and 11K are image bearing members for carrying developers of different colors: yellow, magenta, cyan, and black. Charge rollers 12Y, 12M, 12C, and 12K are primary charging units for different colors for uniformly charging the photosensitive drums 11Y, 11M, 11C, and 11K, respectively, to a predetermined potential. Optical units 13Y, 13M, 13C, and 13K radiate laser beams corresponding to image data of different colors to the photosensitive drums 11Y, 11M, 11C, and 11K charged by the charge rollers 12Y, 12M, 12C, and 12K, respectively, to form electrostatic latent images. Development units 14Y, 14M, 14C, and 14K visualize the electrostatic latent images formed on the photosensitive drums 11Y, 11M, 11C, and 11K, respectively. Development rollers 15Y, 15M, 15C, and 15K are developer carriers for developing the developers in the development units 14Y, 14M, 14C, and 14K to the photosensitive drums 11Y, 11M, 11C, and 11K, respectively. Primary transfer rollers 16Y, 16M, 16C, and 16K are primary transfer units for primarily transferring the images formed on the photosensitive drums 11Y, 11M, 11C, and 11K, respectively.

An intermediate transfer belt 17 is an intermediate transfer member for carrying images primarily transferred from the photosensitive drums 11. A drive roller 18 drives the intermediate transfer belt 17. A tension roller 25 applies a tension to the intermediate transfer belt 17. A secondary transfer roller 19 transfers the image formed on the intermediate transfer belt 17 onto the recording material P. A secondary transfer counter roller 20 faces the secondary transfer roller 19 via the intermediate transfer belt 17. A fixing unit 21 melts and fixes the developer image having been transferred to the recording material P, to the recording material P while conveying the recording material P. A discharge roller pair 22 discharges the recording material P with the image fixed thereto by the fixing unit 21.

A control unit 3 including a central processing unit (CPU) 80 collectively controls image forming operations of the image forming apparatus 1. When print data including print commands and image information is input to the control unit 3 from a host computer (not illustrated), the image forming apparatus 1 starts printing operations. The recording material P is fed from the feeding cassette 2 by the feed roller 4 and then sent to the conveyance path toward the image forming unit including the photosensitive drums 11 and the intermediate transfer belt 17. At the time of image forming for the first recording material P, the control unit 3 synchronizes the timing of the image forming operation for forming an image on the intermediate transfer belt 17 with the timing of the convenience of the recording material P. Therefore, the recording material P is once temporarily stopped while being pinched by the conveyance roller pair 6, and then conveyed when image formation is performed. However, the second and subsequent recording materials P are conveyed in succession without being temporarily stopped.

The following series of image forming operations are performed in synchronization with the operation for feeding the recording material P. First, the photosensitive drums 11Y, 11M, 11C, and 11K are charged by the charge rollers 12Y, 12M, 12C, and 12K, respectively, to a predetermined potential. The optical units 13Y, 13M, 13C, and 13K perform exposure scanning on the surfaces of the charged photosensitive drums 11Y, 11M, 11C, and 11K, respectively, with laser beams corresponding to input print data to form electrostatic latent images. The formed electrostatic latent images are developed by the development units 14Y, 14M, 14C, and 14K and the development rollers 15Y, 15M, 15C, and 15K, respectively, to be visualized as images of each of the colors.

The photosensitive drums 11Y, 11M, 11C, and 11K in contact with the intermediate transfer belt 17 rotate in synchronization with the rotation of the intermediate transfer belt 17. The developer images of each color developed on the photosensitive drums 11Y, 11M, 11C, and 11K are sequentially transferred onto the intermediate transfer belt 17 in an overlapped way by the primary transfer rollers 16Y, 16M, 16C, and 16K, respectively. Then, the developer image (color image) formed by the development in an overlapped way is moved to the secondary transfer roller 19 and the secondary transfer counter roller 20 together with the intermediate transfer belt 17, and then secondarily transferred onto the recording material P. The color image having been transferred onto the recording material P is heated and pressurized by the fixing unit 21 to be fixed to the recording material P. The recording material P with the color image fixed thereto is discharged to a discharge tray 26 by the discharge roller pair 22. This completes a normal color image forming operation.

A belt cleaning unit 36 is disposed above the intermediate transfer belt 17. After the image transfer, a cleaning member such as a cleaning blade 35 in the belt cleaning unit 36 scratches residual developers on the intermediate transfer belt 17. Then, the image forming apparatus 1 becomes ready for the next image formation.

In the image forming apparatus 1 in FIG. 1, a sound collector 71 (sound detection unit) is disposed near the conveyance path for conveying the recording material P. The sound collector 71 includes a Micro Electro Mechanical System (MEMS) microphone for converting the vibration displacement of a vibrating plate by pressure into a voltage variation, and an electrode terminal for outputting the voltage variation. The signal output from the sound collector 71 is sent to a sound processing unit 70.

[Descriptions of Drive Units]

Figure 2:
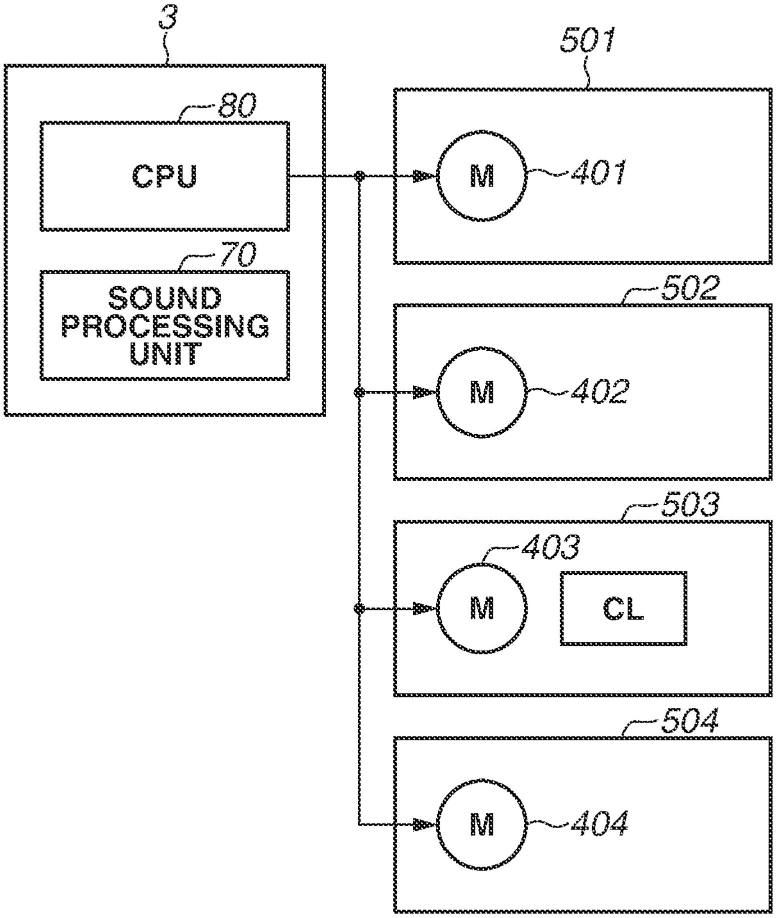
FIG. 2 is a block diagram illustrating a configuration of a plurality of drive units according to the first exemplary embodiment.

Drive units of the image forming apparatus 1 will be described below with reference to FIG. 2. The image forming apparatus 1 according to the present exemplary embodiment includes a plurality of drive units. Each drive unit includes an actuator (drive source) such as a motor, and a transfer mechanism such as a clutch and gears.

The image forming apparatus 1 includes a sheet feeding drive unit 501 having a sheet feeding motor 401 for driving the feed roller 4 and the conveyance roller pair 6. The image forming apparatus 1 further includes a belt drum drive unit 502 having a drum motor 402 for driving the drive roller 18 of the intermediate transfer belt 17 and the photosensitive drums 11Y, 11M, 11C, and 11K. The image forming apparatus 1 further includes a development drive unit 503 having a development motor 403 for driving the development rollers 15Y, 15M, 15C, and 15K and a screw (not illustrated) in the belt cleaning unit 36. The image forming apparatus 1 further includes a fixing drive unit 504 having a fixing motor 404 for driving a pressure roller 202 and the discharge roller pair 22.

The development drive unit 503 having an electromagnetic clutch CL enables individually driving and stopping the development rollers 15Y, 15M, 15C, and 15K and the screw in the belt cleaning unit 36. To clean the intermediate transfer belt 17, the image forming apparatus 1 drives the intermediate transfer belt 17 immediately before and after the image forming operation. In this case, it is desirable that, while the screw in the belt cleaning unit 36 is driven, the development rollers 15Y, 15M, 15C, and 15K are stopped to prevent the developers from being degraded by the friction with the development rollers 15. For this reason, with the development rollers 15Y, 15M, 15C, and 15K stopped, the control unit 3 drives the screw in the belt cleaning unit 36 by using the electromagnetic clutch CL of the development drive unit 503.

[Descriptions of Control Block Diagram for Abnormal Sound Diagnosis]

A control block diagram for abnormal sound diagnosis will be described below with reference to FIG. 3. The sound collector 71 is used for abnormal sound diagnosis. The sound processing unit 70 includes an amplification unit 702, an analog-to-digital (A/D) conversion unit 703, a reference A/D value setting unit 704, a filter calculation unit 705, a square calculation unit 706, a section average calculation unit 707, and a storage unit 708.

A reception sound received by the sound collector 71 is amplified by the amplification unit 702. Then, the reception sound as an analog signal is converted into a digital signal by the A/D conversion unit 703. Since the voltage output from the sound collector 71 is a positive value, it is necessary to remove the DC component to extract only sound pressure variations. Therefore, the reference A/D value setting unit 704 subtracts a reference A/D value specified by the CPU 80 from the A/D-converted reception sound to extract sound pressure variations. Then, the reception sound with the DC component removed is subjected to filter processing for passing only sounds with specific frequencies by the filter calculation unit 705. This filter processing enables increasing the probability of abnormal sound detection. A filter setting includes a low-pass filter, a high-pass filter, a band-pass filter, and many other types of filters, and can be suitably changed according to an instruction from the CPU 80. The reception sound having undergone the filter calculation is subjected to the square calculation by the square calculation unit 706, and then further subjected to the section average calculation by the section average calculation unit 707. The square calculation and the section average calculation facilitates the comparison of the sound volume at the time of the abnormal sound diagnosis. Although a 30-ms section is averaged in the present exemplary embodiment, the present disclosure is not limited thereto. For example, a plurality of sections may be provided and selected, or sections may be optionally set. The reception sound having undergone the section averaging is stored in the storage unit 708 as a signal level.

The CPU 80 acquires the data from the storage unit 708 and determines whether the data exceeds a threshold value corresponding to the operation mode of the image forming apparatus 1 or the selected filter. If the data exceeds the threshold value, the CPU 80 gives a diagnosis that an abnormal sound is generated. Then, depending on the abnormal sound, the CPU 80 issues a control instruction for preventing the abnormal sound generation to the image forming apparatus 1, and notifies the user and administrator of the location where the abnormal sound is generated. One or more server devices connected to the image forming apparatus 1 via a network may also perform the above processing of the CPU 80.

[Descriptions of Prolonged Drive Mode]

A dedicated drive mode for identifying the cause of abnormal sound generation, which characterizes the present disclosure, will be described below. The dedicated drive mode according to the present exemplary embodiment will be described below centering on a prolonged drive mode in which, after completion of the image forming operation for the recording material P, a post-rotation operation (the motors are driven for a predetermined time for cleaning) is implemented and the drive time of some drive units is prolonged. However, the present disclosure is not limited thereto. More specifically, the present disclosure needs to individually drive the motors that are concurrently operated during the image forming operation. In addition to partly prolonging the post-rotation operation, the dedicated drive mode may be implemented, for example, while the image forming apparatus 1 is in a wait state (or standby state).

FIGS. 4A to 4E are charts illustrating variations of the signal level in a case where the apparatus 1 is operated in the normal mode and in a case where the prolonged drive mode during the post-rotation operation. Solid lines indicate the normal mode, and dotted lines indicate the prolonged drive mode. In this case, the drive time of the fixing motor 404 is prolonged.

Figure 4A:
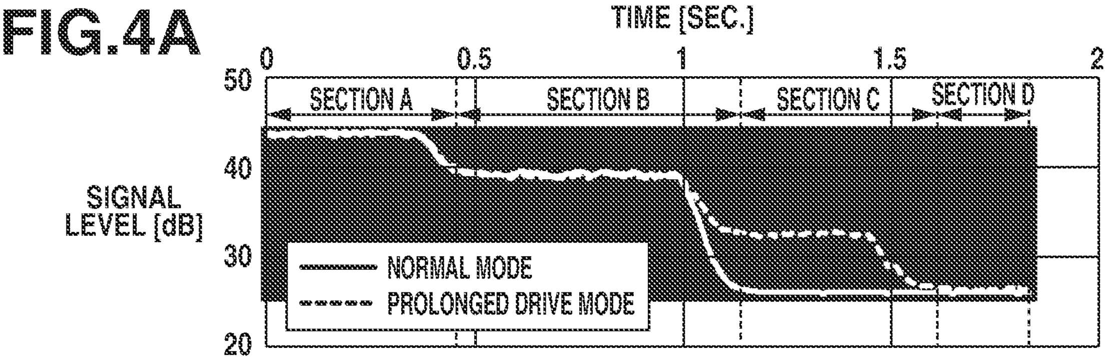
FIGS. 4A to 4E are charts illustrating sounds and operating statuses of each of the drive sources when individual drive is implemented according to the first exemplary embodiment.
Figure 4B:
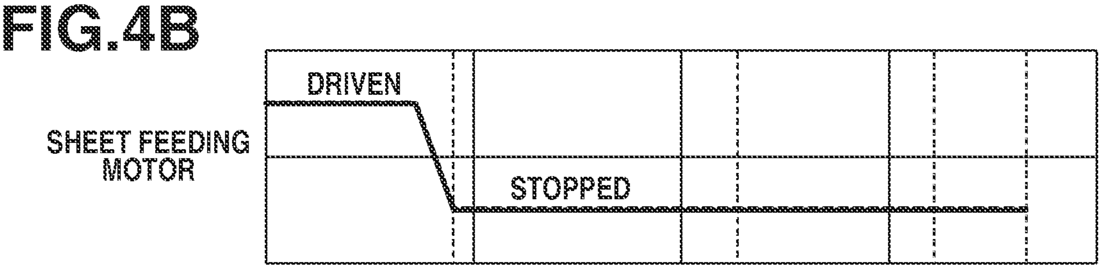
Figure 4C:
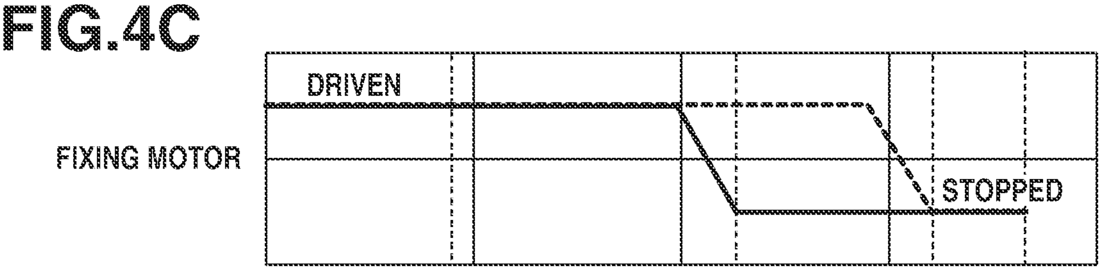
Figure 4D:
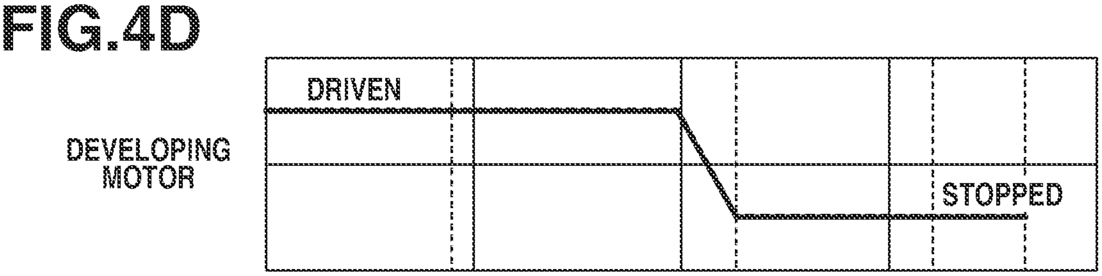
Figure 4E:
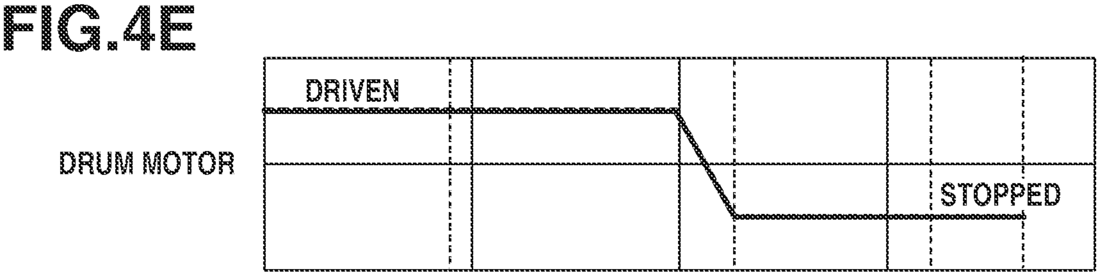

FIG. 4A illustrates sound signal waveforms output by the sound processing unit 70 corresponding to the sound collected by the sound collector 71. FIGS. 4B, 4C, 4D, and 4E illustrate drive statuses of the sheet feeding motor 401, the fixing motor 404, the development motor 403, and the drum motor 402, respectively, at the same time as the time in FIG. 4A.

Referring to FIGS. 4A to 4E, the post-rotation operation of the image forming apparatus 1 is started at time 0 seconds. In the normal mode, the sheet feeding motor 401 stops in section A, and the fixing motor 404, the development motor 403, and the drum motor 402 stop in section B. In this case, to prevent component failures and sound generation due to sudden stop, the CPU 80 takes approximately 0.1 seconds to stop these motors, as indicated by the inclined lines in FIGS. 4B to 4E. Hereinafter, the inclination operation for about 0.1 is referred to as motor slowdown.

In the prolonged drive mode indicated by the dotted lines in FIGS. 4B to 4E, the CPU 80 drives the motors to perform the same operation up to section B except for the fixing motor 404, and drives the fixing motor 404 up to section C. The CPU 80 can determine generation of an abnormal sound by the fixing motor 404 only, by receiving the sound when only the fixing motor 404 is driven in section C. More specifically, if an abnormal sound is generated during this period, the CPU 80 can identify a component driven by the fixing motor 404 as the cause of the abnormal sound.

It is desirable to implement the prolonged drive mode by limiting the operation target to the motors that produce no trouble (failures or lifetime expiration) of components of the image forming apparatus 1 even when the motors are individually driven. According to the exemplary embodiment, to avoid the shortening of the lifetime of the intermediate transfer belt 17 and the photosensitive drums 11, the CPU 80 does not implement the prolonged drive mode of the drum motor 402. The CPU 80 sequentially implements the prolonged drive mode of other motors including the sheet feeding motor 401, the development motor 403, and the fixing motor 404. When implementing the prolonged drive mode of the development motor 403, the CPU 80 operates the development motor 403 with the electromagnetic clutch CL turned OFF to prevent degradation of the developers, as described above.

The CPU 80 may implement the prolonged drive mode of a combination of a plurality of motors that cannot be individually driven. Examples of such configurations include a case where two different components constantly in contact with each other are driven by different drive sources. In this case, if one component is driven while the other component is stopped, wear of the components due to the abrasion is accelerated. Therefore, both drive sources need to be set to operate when the prolonged drive mode is implemented.

[Descriptions of Flowchart of Prolonged Drive Mode]

Figure 5:
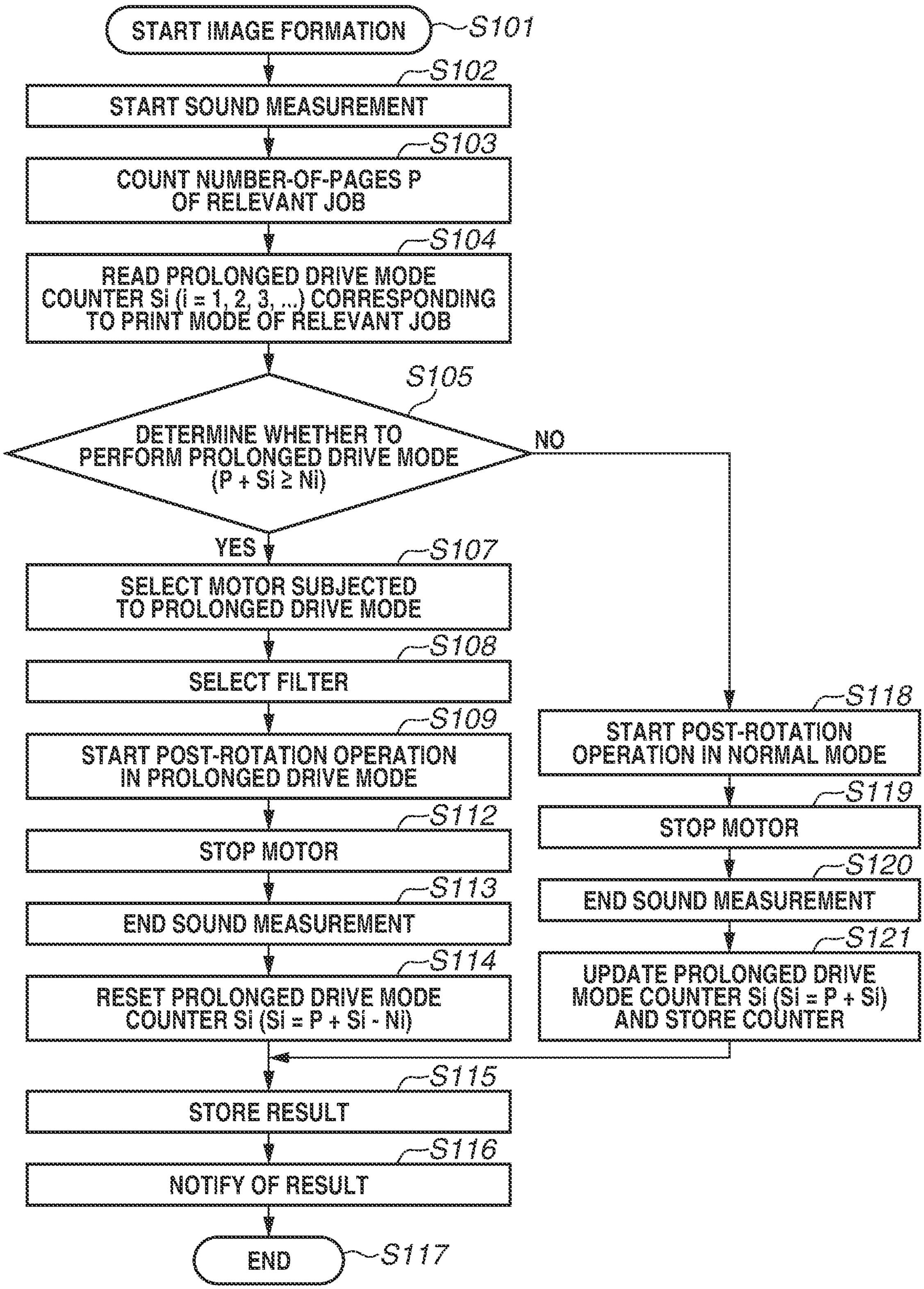
FIG. 5 is a flowchart illustrating procedures for implementing individual drive according to the first exemplary embodiment.

A flowchart for implementing the prolonged drive mode according to the present exemplary embodiment will be described below with reference to FIG. 5. The flowchart illustrated in FIG. 5 is implemented when the CPU 80 included in the control unit 3 executes a program stored in a ROM (not illustrated).

In step S101, the CPU 80 starts the image forming operation. In step S102, the CPU 80 starts the printing sound measurement by using the sound collector 71. The printing sound measurement is used to determine whether an abnormal sound is generated during the image formation, and is performed in both the normal mode and the prolonged drive mode. In step S103, the CPU 80 counts the number of pages P of the relevant job. In step S104, the CPU 80 reads the prolonged drive mode counter Si corresponding to the print mode of the relevant job.

The print mode refers to the monochrome and color modes or the operation mode of the image forming apparatus 1 which changes according to the type of the recording material P (hereinafter referred to as the paper type). The types of driven motors differ between the monochrome and the color modes, and the operating speed of each motor depends on the operation mode corresponding to the paper type. For this reason, the image forming apparatus 1 according to the present exemplary embodiment is provided with different counters for different print modes. The number i (i=1, 2, 3 . . . ) in step S104 indicates the types of the print modes included in the image forming apparatus 1. In all of the print modes, the initial value of the prolonged drive mode counter Si is 0.

In step S105, the CPU 80 determines whether the sum of the prolonged drive mode counter Si read in step S104 and the number of pages P, P+Si, exceeds a preset threshold value Ni. More specifically, during execution of the image forming operation, the CPU 80 increments the counter Si and determines whether the value of the counter Si reaches the threshold value Ni. The threshold value Ni is individually set for each print mode. In a case where the CPU 80 determines that (P+Si) exceeds the threshold value Ni (YES in step S105), the processing proceeds to step S107. In steps S107 to S117, the CPU 80 implements the prolonged drive mode. The determination whether to implement the above-described prolonged drive mode (steps S104 and S105) will be described below with reference to examples.

In the prolonged drive mode, then in step S107, the CPU 80 selects the motor subjected to the implementation of the prolonged drive mode. In step S108, the CPU 80 selects the filter to be used by the filter calculation unit 705. In step S109, the CPU 80 starts the post-rotation operation in the prolonged drive mode, and starts the sound measurement for the prolonged drive mode by using the sound collector 71. Examples of waveforms measured in this step are illustrated in FIGS. 4A to 4E. According to the present exemplary embodiment, to implement the prolonged drive mode following the post-rotation operation, the CPU 80 implements the prolonged drive mode at the operating speed for the relevant print mode. With this processing, the operating sound hardly changes, allowing the user to perform the prolonged drive mode without caring about the operating sound.

When the prolonged drive mode is completed, then in step S112, the CPU 80 stops the motors. In step S113, the CPU 80 completes the sound measurement with the sound collector 71. After the sound measurement is completed, then in step S114, the CPU 80 resets the prolonged drive mode counter Si for the relevant job. In step S115, the CPU 80 stores measurement results in the storage unit 708. In step S116, the CPU 80 notifies the user and administrator of the measurement results. In step S117, the CPU 80 completes control.

On the other hand, in a case where the CPU 80 determines that (P+Si) is smaller than the threshold value Ni (NO in step S105), the processing proceeds to step S118. In step S118, the CPU 80 starts the post-rotation operation in the normal mode instead of implementing the prolonged drive mode. When the post-rotation operation is completed, then in step S119, the CPU 80 stops the motors. In step S120, the CPU 80 completes the sound measurement with the sound collector 71. In step S121, the CPU 80 updates the prolonged drive mode counter Si to (P+Si) and stores the counter value in the CPU 80. In step S115, even in a case where the prolonged drive mode is not implemented, the CPU stores the measurement results as the sound in the normal mode. In step S116, the CPU 80 notifies the user and administrator of the measurement results. In step S117, the processing exits the control flowchart.

Although, in the flowchart, the CPU 80 notifies the user and administrator of results of the sound diagnosis each time (step S116), the present disclosure is not limited thereto. When the CPU 80 determines that no abnormal sound is generated, the processing may skip step S116 and exit the control flowchart.

[Example of Determination Whether to Implement Prolonged Drive Mode]

An example of the determination whether to implement the prolonged drive (step S105) will be described below. As an example, the image forming apparatus 1 has three different print modes (i=1, 2, 3), and the threshold value (page interval) of the prolonged drive mode is Ni=100 (i=1, 2, 3).

First, when the job of print mode 1 is executed for 10 sheets, (P+S1) equals 10 since P=10 and S1=0 (initial value). Since (P+S1=10) is equal to or smaller than the threshold value Ni (=100), the CPU 80 does not implement the prolonged drive mode. At this timing, the CPU 80 stores Si=10.

Subsequently, when the job of print mode 1 is executed for 100 sheets, (P+S1) equals 110 since P=100 and Si=10 and exceeds the threshold value Ni (=100). As a result, the CPU 80 implements the prolonged drive mode. After implementing the prolonged drive mode, the CPU 80 resets the value of Si to (P+S1−N1=10) and stores the counter value. Then, the CPU 80 does not implement the prolonged drive mode until S1 exceeds N1 again but performs the sound measurement in the normal mode.

According to the present exemplary embodiment, as descried above, the CPU counts the number of printed sheets and implements the prolonged drive mode when the total number of printed sheets exceeds the threshold value. In other words, the CPU 80 periodically implements the prolonged drive mode based on the number of printed sheets.

Periodically implementing the prolonged drive mode enables capturing not only the presence of an abnormal sound but also a sign of abnormal sound before the abnormal sound generation (described below). Further, by individually counting the number of printed sheets for each print mode, the CPU 80 implements the prolonged drive mode giving priority to a print mode frequently used by the user. This makes it easier to capture an abnormal sound in the print mode.

[Types of Prolonged Drive Modes]

Selections of a motor and a filter subjected to the implementation of the prolonged drive mode (steps S107 and S108) will be described below with reference to FIG. 6.

FIG. 6 is a table illustrating combinations of a motor and a filter to be subjected to the implementation of the prolonged drive mode. To prevent the excessive increase of a downtime during which the image forming apparatus 1 is unusable and prevent the user from feeling uncomfortable, it is desirable to implement the prolonged drive mode in a short time. Thus, as illustrated in FIG. 6, the prolonged drive mode is classified into nine different types corresponding to the combinations of a motor and a filter. The CPU 80 implements only one of prolonged drive mode Nos. 1 to 9 in a single implementation of the prolonged drive mode. According to the present exemplary embodiment, the CPU 80 sequentially repeats prolonged drive mode Nos. 1 to 9 to uniformly monitor an abnormal sound of each motor.

Types of filters will be described below. According to the present exemplary embodiment, three different types of filters are prepared: a through filter ("Through" in FIG. 6), a low-pass filter ("Low Frequency" in FIG. 6), and a high-pass filter ("High Frequency" in FIG. 6). The through filter supports a frequency band from 0 to 45 kHz, the low-pass filter supports a frequency band from 0 to 4 kHz, and the high-pass filter supports a frequency band from 4 kHz to 10 kHz. According to the present exemplary embodiment, since the sound collector 71 collects sound signals with a 90-kHz sampling frequency, the through filter covers the entire frequency band of sound signals detected by the sound collector 71.

The filter calculation unit 705 (illustrated in FIG. 3) functions as an Application Specific Integrated Circuit (ASIC) that outputs the average level of sound signals (average amplitude level of sounds) included in the frequency band supported by the set filter. For example, in a case where prolonged drive mode No. 4 in FIG. 6 is selected, the CPU 80 drives the sheet feeding motor 401 with the low-pass filter set to the filter calculation unit 705.

At this timing, the filter calculation unit 705 outputs the average level of sound signals contained in the frequency band from 0 to 4 kHz.

[Descriptions of Example Results of Abnormal Sound Detection in Prolonged Drive Mode]

Figure 7A:
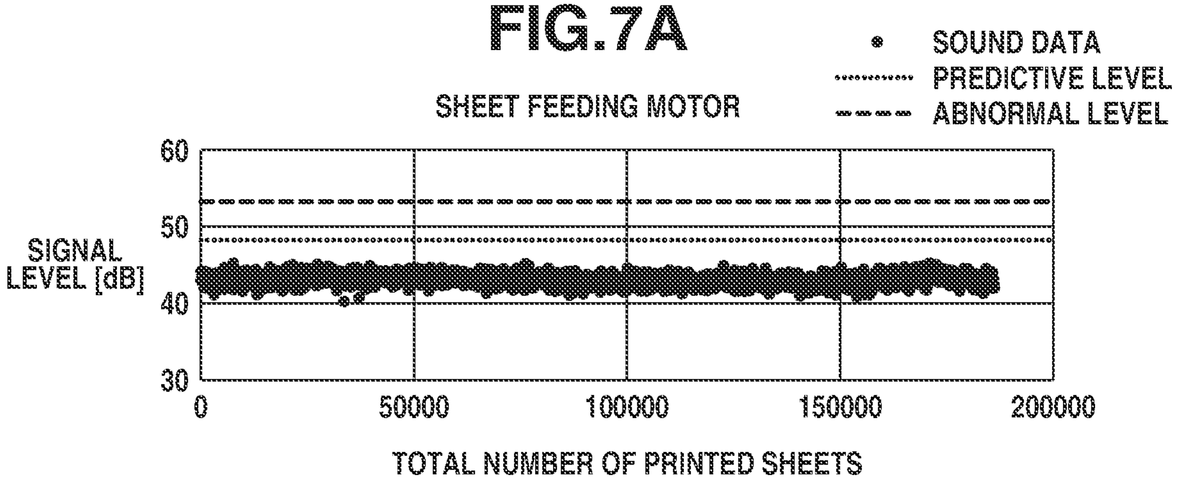
FIGS. 7A to 7C are charts illustrating sound level transitions when individual drive is implemented according to the first exemplary embodiment.
Figure 7B:
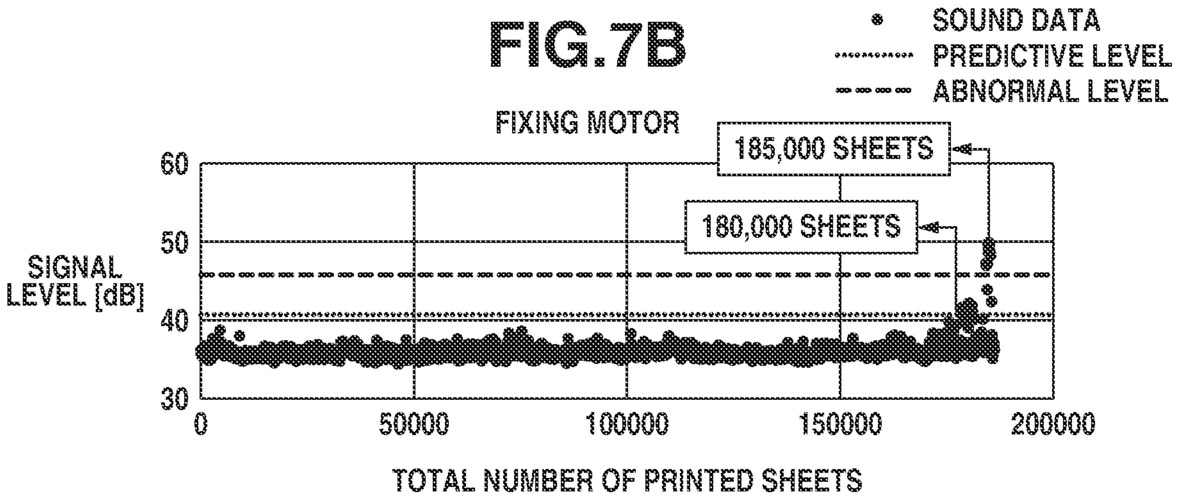
Figure 7C:
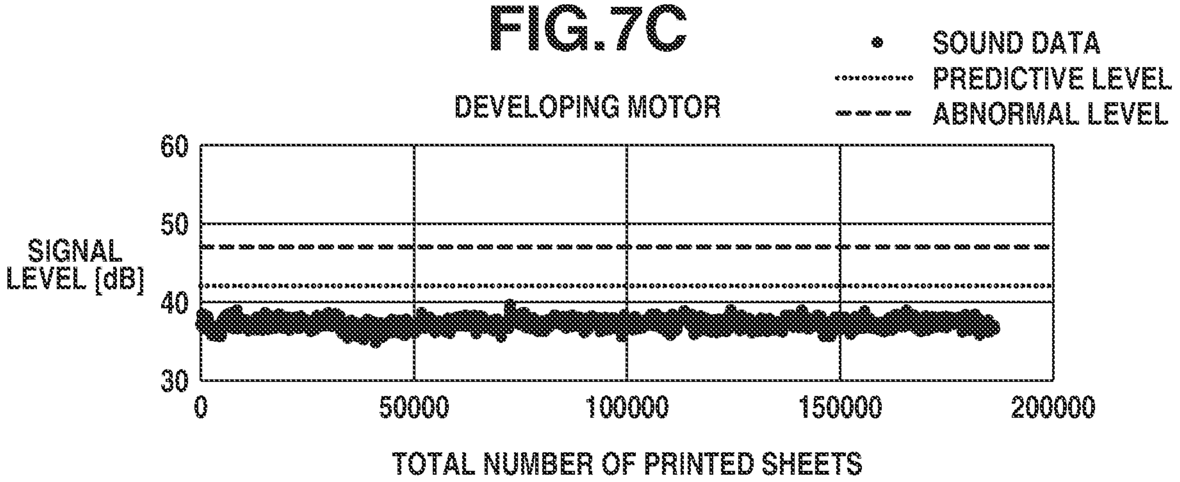

Example results of the abnormal sound detection in the prolonged drive mode will be described below with reference to FIGS. 7A to 7C. FIGS. 7A, 7B, and 7C are charts illustrating sound level transitions by plotting average sound levels in section C in FIGS. 4B, 4C, and 4D, respectively, in a range excluding the motor slowdown, with the horizontal axis assigned the total number of printed sheets. These charts enable observing sound level transitions in different prolonged drive modes. In this case, the CPU 80 performed each of prolonged drive mode Nos. 1 to 9 illustrated in FIG. 6 after printing of 100 sheets. FIG. 7A illustrates a sound level transition in prolonged drive mode No. 1 (using the sheet feeding motor 401 and the through filter). FIG. 7B illustrates a sound level transition in prolonged drive mode No. 2 (using the fixing motor 404 and the through filter). FIG. 7C illustrates a sound level transition in prolonged drive mode No. 3 (using the development motor 403 and the through filter).

The predictive and the abnormal levels illustrated in FIGS. 7A to 7C are preset values. The predictive level is the normal level +5 dB, and the abnormal level is the normal level +10 dB. The normal level is calculated based on the history of past data, for example, by calculating the average value and median of signal levels.

Referring to FIG. 7B, the signal level of the fixing motor 404 reaches the predictive level with 180,000 sheets and reaches the abnormal level with 185,000 sheets. Referring to FIGS. 7A and 7C, the signal levels of the sheet feeding motor 401 and the development motor 403 are below the predictive and the abnormal levels, and are within the normal sound level. Thus, the CPU 80 determines that an abnormal sound is generated in the fixing drive unit 504 including the fixing motor 404 or in the fixing unit 21. The CPU 80 may determine whether the signal level exceeds the abnormal or the predictive level like in FIG. 7B after performing statistical processing such as obtaining the moving average for a predetermined number of data pieces based on the average value of plotted sound levels, and calculating the percentile value.

Figure 8:
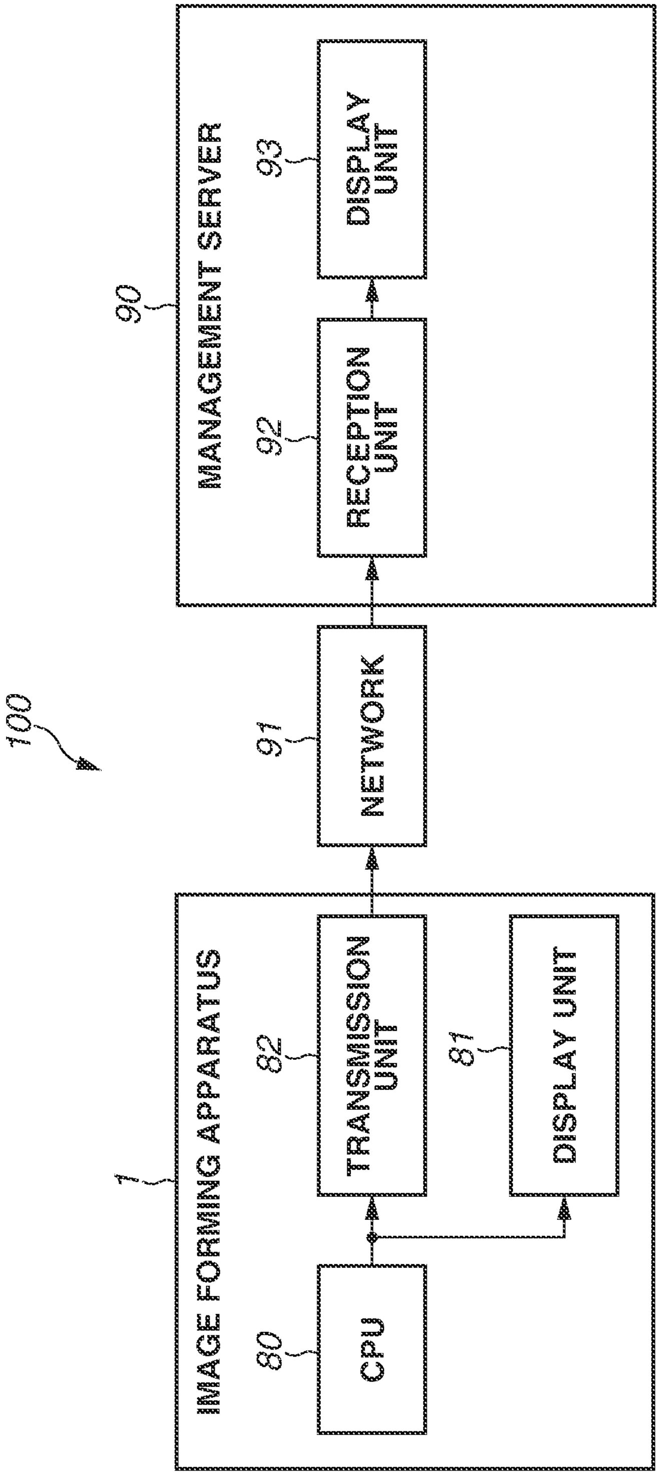
FIG. 8 illustrates a configuration for displaying and transmitting the generation of an abnormal sound according to the first exemplary embodiment.

A method for notifying of the results of the sound analysis in the prolonged drive mode illustrated in FIGS. 7A to 7C will be described below with reference to FIG. 8. FIG. 8 illustrates not only the image forming apparatus 1 but also a management server 90 connected with the image forming apparatus 1 via a network 91. The management server 90 is a terminal used by the administrator to provide maintenance services of the image forming apparatus 1. The image forming apparatus 1 and the management server 90 are collectively referred to as an image forming system 100.

Referring to FIG. 8, the image forming apparatus 1 includes a display unit 81 and a transmission unit 82. When the cause of abnormal sound generation is identified, the display unit 81 displays the component that generates the abnormal sound and prompts the user to replace the component. The transmission unit 82 transmits information about the defective component to the management server 90 via the network 91. The management server 90 includes a reception unit 92 and a display unit 93. The reception unit 92 receives information transmitted from the transmission unit 82, and the display unit 93 displays information about the defective component. This allows the administrator who manages the image forming apparatus 1 to prompt the user to replace the component or supply the component, thus maintaining the image forming apparatus 1 in the normal state.

Implementing the prolonged drive mode with each of the motors in this way enables detecting the generation of an abnormal sound and identifying the motor or unit that is the cause of the abnormal sound. This makes it easier for the user or administrator of the image forming apparatus 1 to take measures for the abnormal sound by replacing or inspecting the defective component.

Further, if the prolonged drive mode is periodically implemented, the presence of an abnormal sound enables detecting not only the abnormal level but also the sign of abnormal sound before the signal level reaches the abnormal level. This allows the user or administrator of the image forming apparatus 1 to know the generation of an abnormal sound in advance, making it possible to reduce the downtime of the image forming apparatus 1 by preparing for component replacement and performing preventive inspection.

[Descriptions of Method for Identifying Cause of Abnormal Sound Through Combination of Normal and Prolonged Drive Modes]

A method for detecting an abnormal sound of motors not subjected to the implementation of the prolonged drive mode will be described below with reference to FIGS. 9A to 9D, centering on example results of the abnormal sound detection different from those in FIGS. 7A to 7C.

Figure 9A:
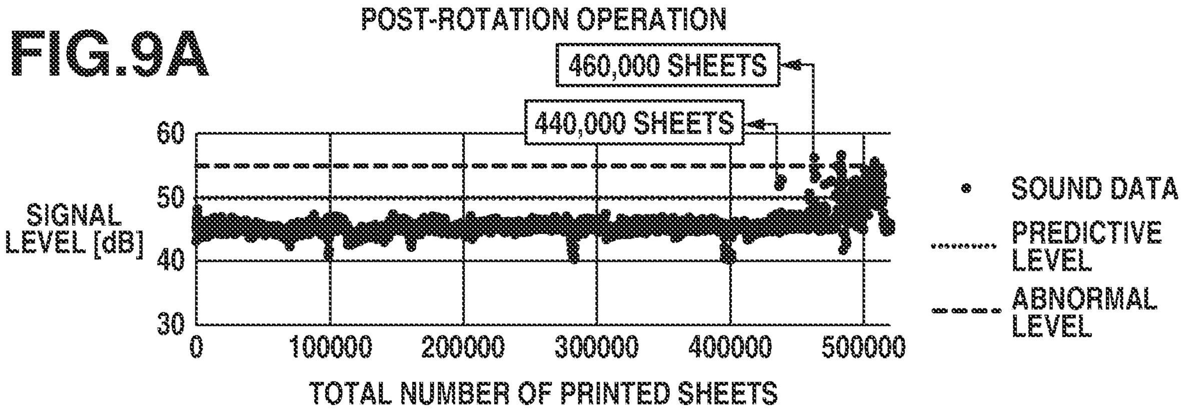
FIGS. 9A to 9D are charts illustrating sound level transitions in individual drive and sound level transitions in a normal post-rotation operation according to the first exemplary embodiment.

FIG. 9A is a chart illustrating a sound level transition by plotting average sound levels in section A in FIG. 4A, with the horizontal axis assigned the total number of printed sheets. As described above, in section A in FIG. 4A, information can be received even in the post-rotation operation in the normal mode. Like FIGS. 7A, 7B, and 7C, FIGS. 9B, 9C, and 9D are charts illustrating sound level transitions of the sheet feeding motor 401, the fixing motor 404, and the development motor 403, respectively, in the prolonged drive mode.

Figure 9B:
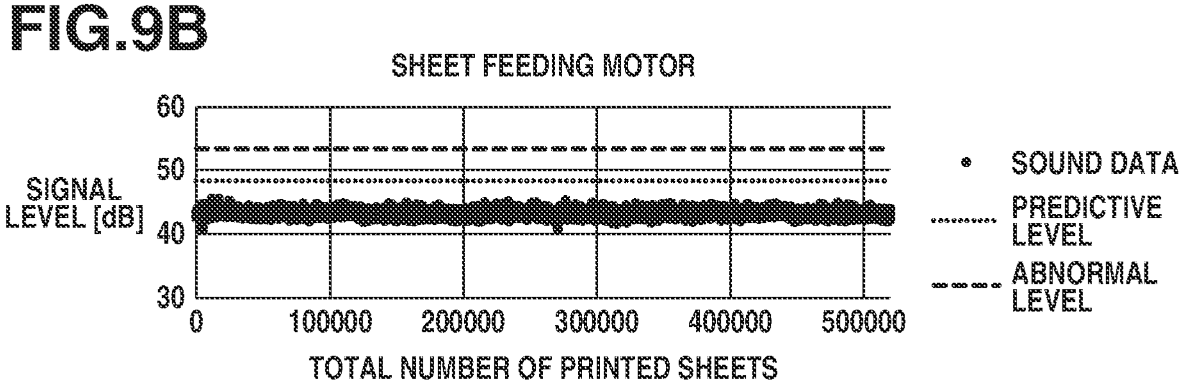
Figure 9C:
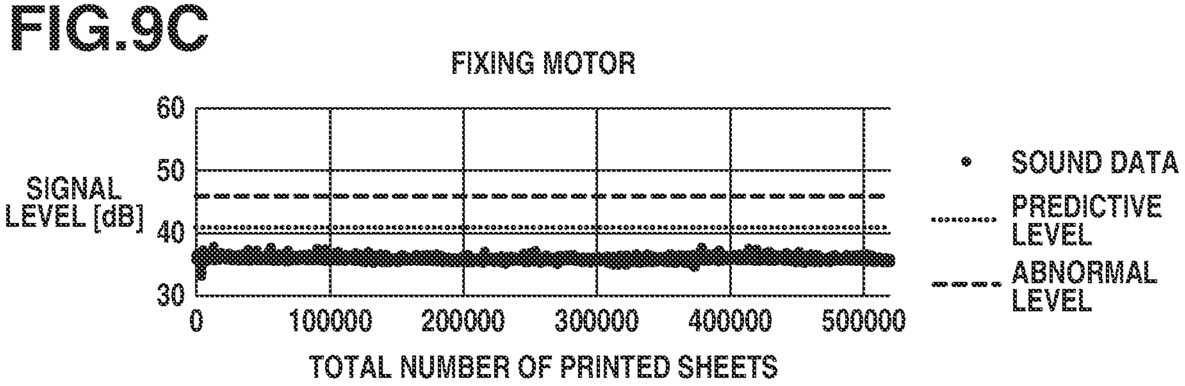
Figure 9D:
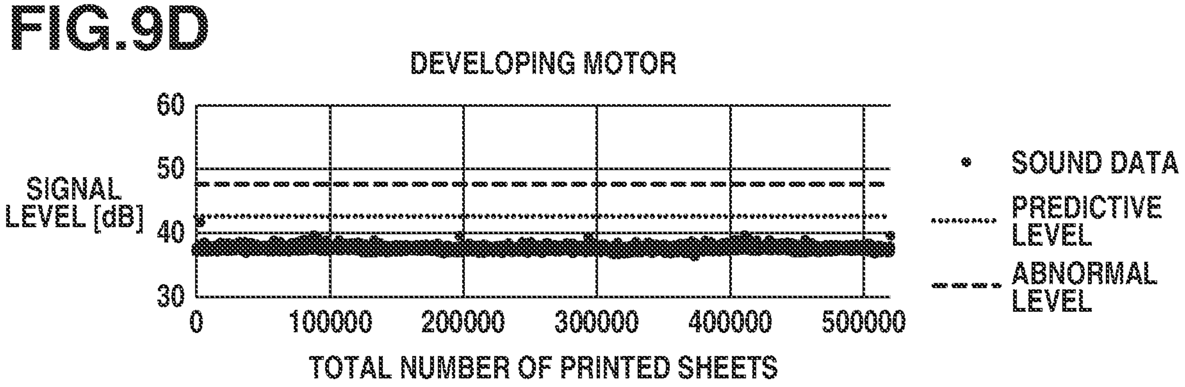

Referring to FIG. 9A, the sound level during the post-rotation operation reaches the predictive level when the total number of printed sheets is 440,000 and reaches the abnormal level when the total number of printed sheets is 460,000. Referring to FIGS. 9B, 9C, and 9D, the signal levels of the sheet feeding motor 401, the fixing motor 404, and the development motor 403 that implemented the prolonged drive mode are below the predictive level and are within the normal level.

As described above, in the present exemplary embodiment, the drum motor 402 is not subjected to the prolonged drive mode since the lifetime of the intermediate transfer belt 17 and the photosensitive drums 11Y, 11M, 11C, and 11K may be possibly shortened.

FIG. 9A illustrates a sound level transition when the drum motor 402, the sheet feeding motor 401, the fixing motor 404, and the development motor 403 concurrently operate. Based on the sound level transitions in the prolonged drive mode in FIGS. 9B to 9D, the motor that revealed a sign of abnormal sound or abnormality in FIG. 9A is assumed to be the drum motor 402. Even with a motor not subjected to the implementation of the prolonged drive mode, the CPU 80 can capture an abnormal sound or a sign of abnormal sound before the abnormal sound generation by suitably combining data of the prolonged drive mode, the sound of the normal image forming operation, and the sound of the post-rotation operation of other motors.

Although, referring to FIG. 9A, the CPU 80 acquires the sound immediately after the post-rotation operation is started, as the sound of the post-rotation operation in the normal mode, the CPU 80 may acquire other sounds during the image formation depending on the target sound. For example, to determine whether an abnormal sound is generated during the conveyance of the recording material P, the CPU 80 may compare the sound during the conveyance of the recording material P and the sound in the prolonged drive mode of each motor to extract a conveyance sound of the recording material P.

As described above, according to the present exemplary embodiment, each time the image forming apparatus 1 completes printing of a predetermined number of sheets, the CPU 80 individually drives each of the motors after the post-rotation operation and individually collects operating sounds of the driven motors and components driven by the motors, by using the sound collector 71. The CPU 80 measures sound level transitions of collected sounds with respect to the total number of printed sheets, detects an abnormal sound and a sign of abnormal sound before the abnormal sound generation, and identifies the component or unit that is the cause of the abnormal sound. Further, by comparing the sound during the image forming operation or during the post-rotation operation in the normal mode with the sound of an individually driven motor, the CPU 80 can detect an abnormal sound generated by a motor that cannot be individually driven. Then, the CPU 80 displays measurement results on the display unit 81 of the image forming apparatus 1 or transmits the results to the management server 90 at a remote location to prompt the user to replace the defective unit or component. This facilitates the maintenance of the image forming apparatus 1, making it possible to shorten what is called a downtime during which the image forming apparatus 1 is unusable and reduce the maintenance cost.

Although the present exemplary embodiment sets the timing for individually driving each motor to the timing immediately after the post-rotation operation, as described above, the dedicated drive mode may be implemented at timings other than the timing immediately after the post-rotation operation, for example, when the image forming apparatus 1 is in a job wait state or standby state. If the total number of printed sheets increases according to the operating status of the image forming apparatus 1, the frequency of implementing the prolonged drive mode may be increased to make it easier to capture an abnormal sound or a sign of abnormal sound.

A method for identifying the cause of abnormal sound generation according to a second exemplary embodiment will be described below with reference to FIGS. 10 and 11. The basic configuration of the second exemplary embodiment is similar to that of the first exemplary embodiment that has been described above with reference to FIGS. 1 to 3. Therefore, descriptions of portions similar to those of the first exemplary embodiment will be omitted, and only portions different from those of the first exemplary embodiment will be described below.

Figure 10:
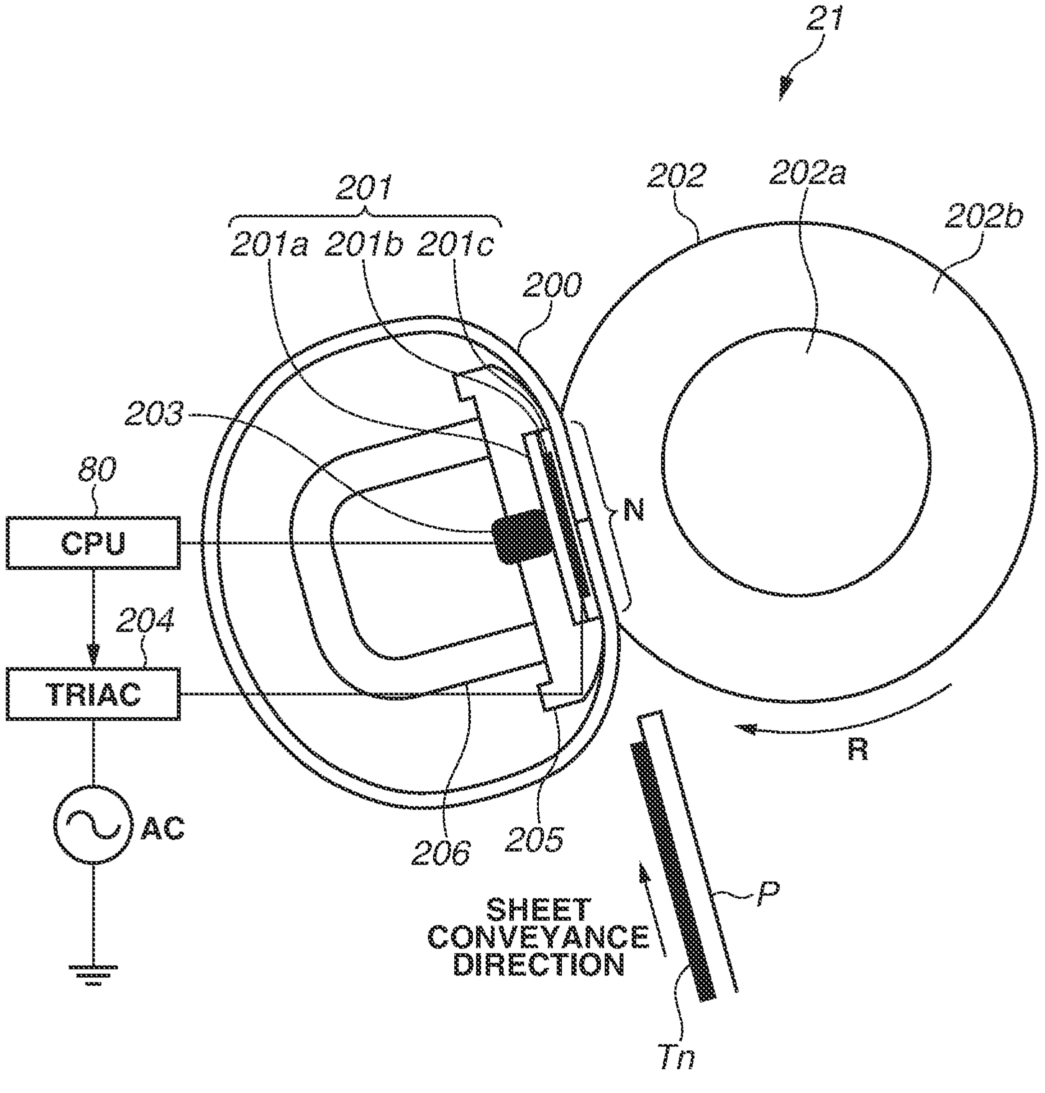
FIG. 10 illustrates a configuration of a fixing unit according to a second exemplary embodiment.

FIG. 10 is a cross-sectional view illustrating details of the fixing unit 21 in FIG. 1. The fixing unit 21 includes a cylindrical fixing film (endless belt) 200, a heater 201 in contact with the inner surface of the fixing film 200, and a pressure roller 202 for forming a fixing nip portion N with the heater 201 via the fixing film 200. The fixing film 200 is composed of a base layer with a thickness of 30 to 70 μm made of a heat resistant resin such as polyimide, polyamide, and polyetheretherketone (PEEK), or a metal such as stainless steel. The fixing film 200 further includes an elastic layer with a thickness of 0.1 to 1 mm made of silicone rubber on the base layer, and a mold release layer with a thickness of 5 to 30 μm made of a fluorocarbon resin such as perfluoro alkoxy alkane (PFA) and polytetrafluoroethylene (PTFE). The surface roughness (Rz level) of the surface of the fixing film 200 was set to 6 μm or less to obtain a sufficient smoothness. For the surface roughness (Rz level) indicated herein, a value measured by using Surface Roughness Measuring Instrument SE-3400 from Kosaka Laboratory Ltd. was used. The surface layer of the fixing film 200 is the surface in contact with a melted toner Tn. The toner surface after completion of the fixing process provides a shape that follows the shape of the surface of the fixing film 200.

The pressure roller 202 includes a core 202*a* made of iron or aluminum, an elastic layer 202*b* with a thickness of 2 to 4 mm made of silicon rubber, and a mold release layer as the outermost layer made of a fluorocarbon resin such as PFA and PTFE. The heater 201 as a heating unit includes a laminated substrate 201*a* primarily made of ceramics containing alumina, and an Ag/Pd (silver palladium) heat generation resistor 201*b* that generates heat when supplied with power, and an insulation protective layer 201*c* (a glass according to the present exemplary embodiment). A temperature detection element 203 such as a thermistor is in contact with the substrate 201*a* and communicates with the CPU 80. The temperature of the heater 201 rises when the heat generation resistor 201*b* is supplied with power. The temperature rise of the heater 201 is detected by the temperature detection element 203. The CPU 80 controls power to be supplied to the heat generation resistor 201*b* via a triac 204. For example, if the detected temperature of the temperature detection element 203 is lower than a predetermined set temperature, the CPU 80 increases power to raise the temperature of the heater 201. If the detected temperature of the temperature detection element 203 is higher than the predetermined set temperature, the CPU 80 decreases power to lower the temperature of the heater 201. Thus, the temperature of the heater 201 is maintained constant.

The heater 201 is supported by a supporting member 205 made of a heat resistant resin such as a liquid crystal polymer (LCP). The supporting member 205 also has a function of guiding the rotation of the fixing film 200. A metal stay 206 applies the pressure of a spring (not illustrated) to the supporting member 205. When a pressurization unit (not illustrated) pressurizes the pressure roller 202 in the direction of the heater 201 via the fixing film 200 with a total pressure of 10 to 30 kgf, the pressure roller 202 forms a nip portion N with a width of 5 to 11 mm. The pressure roller 202 receives motive power from a motor (not illustrated) to rotate in the direction of the arrow R. The fixing film 200 is rotated by the rotation of the pressure roller 202. The recording material P carrying a non-fixed toner image is conveyed together with the fixing film 200, while being pinched by the fixing nip portion N. At the fixing nip portion N, the bearing surface side of the toner image Tn of the recording material P is in close contact with the outer surface of the fixing film 200. This configuration includes the fixing film 200 and the heater 201 having a very small heat capacity, and a heater holder made of a thermal insulation material, making it possible to quickly raise the surface temperature of the fixing film 200 with a small heat quantity.

In the fixing unit 21 using a film in this way, abrasion develops between the fixing film 200 and the supporting member 205 or between the fixing film 200 and the heater 201, and hence an abnormal sound may be generated by a stick slip between these components. An abnormal sound due to a stick slip is likely to occur particularly in a low-speed print mode using the fixing unit 21 that has been used for a prolonged period of time. The low-speed print mode refers to a print mode used in printing on paper thicker than general paper, with a grammage of about 100 to 250 g/m2 and in glossing a printed image. In the low-speed print mode, the motors and units operate at lower speeds than in the normal printing operation.

The present exemplary embodiment is effective in capturing an abnormal sound that is likely to occur in such particular print modes. The present exemplary embodiment will be described in detail below with reference to FIG. 11.

FIG. 11 is a table illustrating combinations of a drive source for the prolonged drive mode and a filter used by the filter calculation unit 705 in the low-speed print mode according to the present exemplary embodiment. According to the present exemplary embodiment, like the first exemplary embodiment, the CPU 80 implements one of prolonged drive mode Nos. 1 to 12 immediately after the post-rotation operation each time the image forming apparatus 1 completes printing of a predetermined number of sheets. According to the first exemplary embodiment, as illustrated in FIG. 6, settings were made to implement the prolonged drive mode at an equal frequency of use for each motor and each filter in all print modes. According to the present exemplary embodiment, as indicated for Nos. 4, 8, and 12 in FIG. 11, settings were made to provide a high implementation frequency of the prolonged drive mode of the fixing motor 404 in the low-speed print mode. The above-described settings make it easier to capture an abnormal sound of a fixing stick slip which is likely to occur in the low-speed print mode.

FIG. 11 illustrates examples of settings. To make it easier to capture an abnormal sound of the fixing motor 404, the implementation frequency of the prolonged drive mode of the sheet feeding motor 401 and the development motor 403 may be reduced in the low-speed print mode. Further, the frequency of the prolonged drive mode can be suitably changed based on the print mode according to the total number of printed sheets, i.e., when the total number of printed sheets reaches a certain value.

As described above, according to the present exemplary embodiment, the CPU 80 implements the prolonged drive mode giving priority to the motor driving a component that is highly likely to generate an abnormal sound in each print mode. This makes it easier to detect an abnormal sound particularly generated in each print mode.

A method for identifying the cause of the abnormal sound generation according to a third exemplary embodiment will be described below with reference to FIGS. 12, 13, and 14. The basic configuration of the third exemplary embodiment is similar to that of the first exemplary embodiment that has been described above with reference to FIGS. 1 to 3. Therefore, descriptions of portions similar to those of the first exemplary embodiment will be omitted, and only portions different from those of the first exemplary embodiment will be described below.

Figure 12:
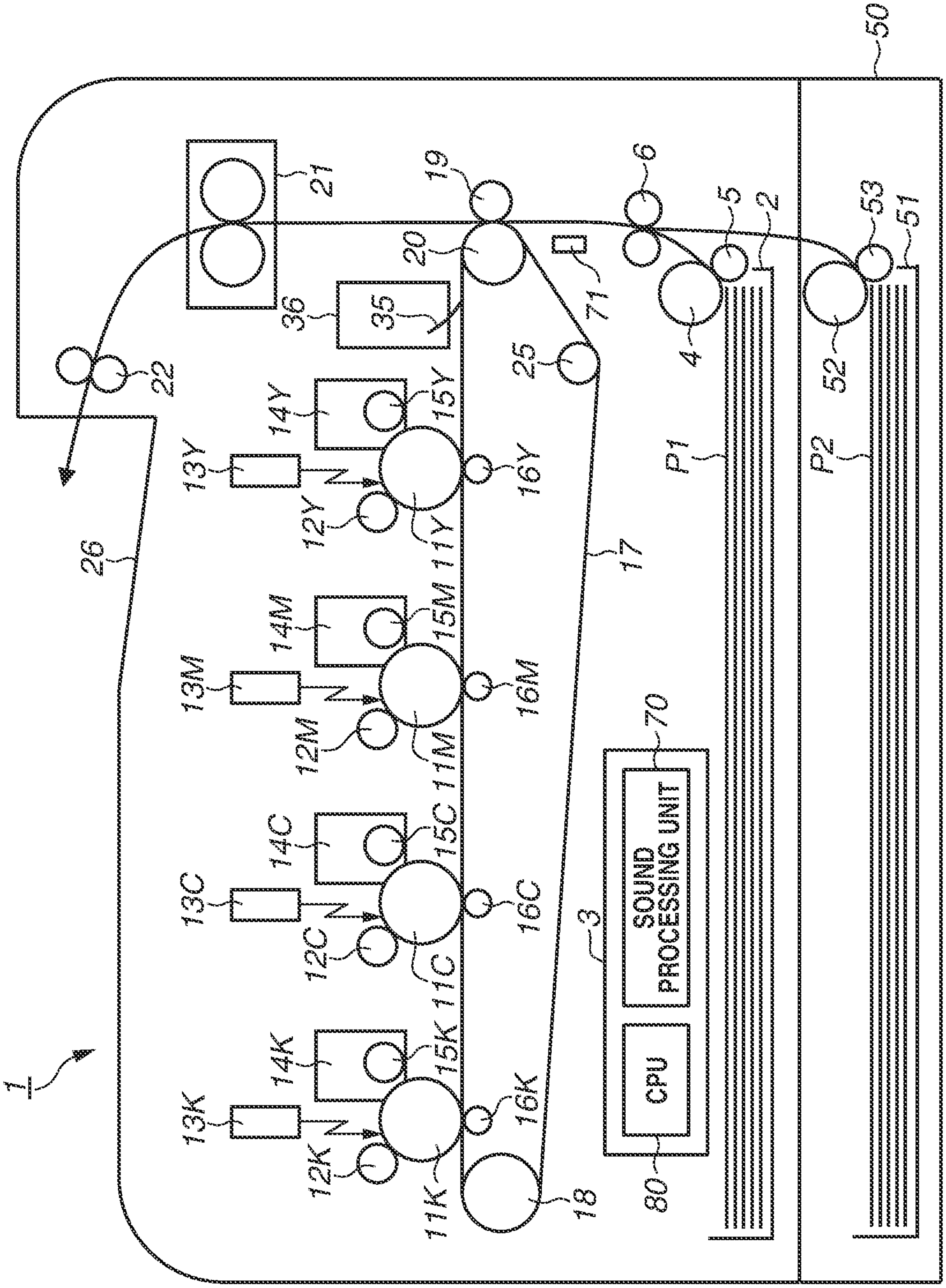
FIG. 12 is a cross-sectional view illustrating an overview of an image forming apparatus according to a third exemplary embodiment.

FIG. 12 illustrates a configuration of the image forming apparatus 1 according to the present exemplary embodiment. An optional sheet feeding unit 50 is added to the configuration illustrated in FIG. 1. For example, recording materials P2 of a different type from the recording materials P1 set in the feeding cassette 2 are set in the optional sheet feeding unit 50. This allows the user to select the type of recording materials to be used from a personal computer (PC) before printing. Alternatively, setting the recording materials P2 of the same type as the recording materials P1, in the optional sheet feeding unit 50 enables reducing the number of times of replenishing paper.

The feed roller 52 and a separation roller 53 illustrated in FIG. 12 have configurations similar to those of the feed roller 4 and the separation roller 5. More specifically, when the feed roller 52 feeds the recording materials P2 from the optional feeding cassette 51, the separation roller 53 separates the recording materials P2 one by one. The feed roller 52 and the separation roller 53 are driven by an optional sheet feeding motor (not illustrated) in the optional sheet feeding unit 50. Since the feed roller 52 and the separation roller 53, and the feed roller 4 and the separation roller 5 are driven by different motors, the CPU 80 is able to perform independent control for driving and stopping these combinations of rollers.

A method for implementing the prolonged drive mode according to the present exemplary embodiment will be described below with reference to FIGS. 13 and 14. According to the first and the second exemplary embodiments, the CPU 80 counts the number of printed sheets for each print mode and implements the prolonged drive mode after printing is completed for a predetermined number of sheets. According to the present exemplary embodiment, the CPU 80 implements the prolonged drive mode based on the number of operations of each motor.

FIG. 13 is a table illustrating sheet feeding ports for printed pages, and the number of operations of the four motors. For example, since the first printed page is fed from the feeding cassette 2, the CPU 80 counts the numbers of operations of the motors other than the OP sheet feeding motor 401 as 1. Since the third printed page is fed from the optional feeding cassette 51, the CPU 80 increments the numbers of operations of all motors including the OP sheet feeding motor. In this configuration, since the sheet feeding motor 401 drives the conveyance roller pair 6, the CPU 80 increments the number of operations of the sheet feeding motor 401 even in a case where a sheet is fed from the optional feeding cassette 51. The CPU 80 counts the numbers of operations of the motors for each printed page in this way. When the numbers of operations reach a predetermined value, the CPU 80 implements the prolonged drive mode.

The threshold value for implementing the prolonged drive mode may be individually set for each motor. The number of operations of each motor may be replaced with the operation time, or a value obtained by multiplying the operation time by the torque applied to each motor. Alternatively, the number of operations may be replaced with the mileage of each motor. In addition, with a drive system using a motor and an electromagnetic clutch, the number of operations may be replaced with a parameter related to the abnormal sound generation, such as the time period during which both the motor and the electromagnetic clutch are ON.

Figure 14:
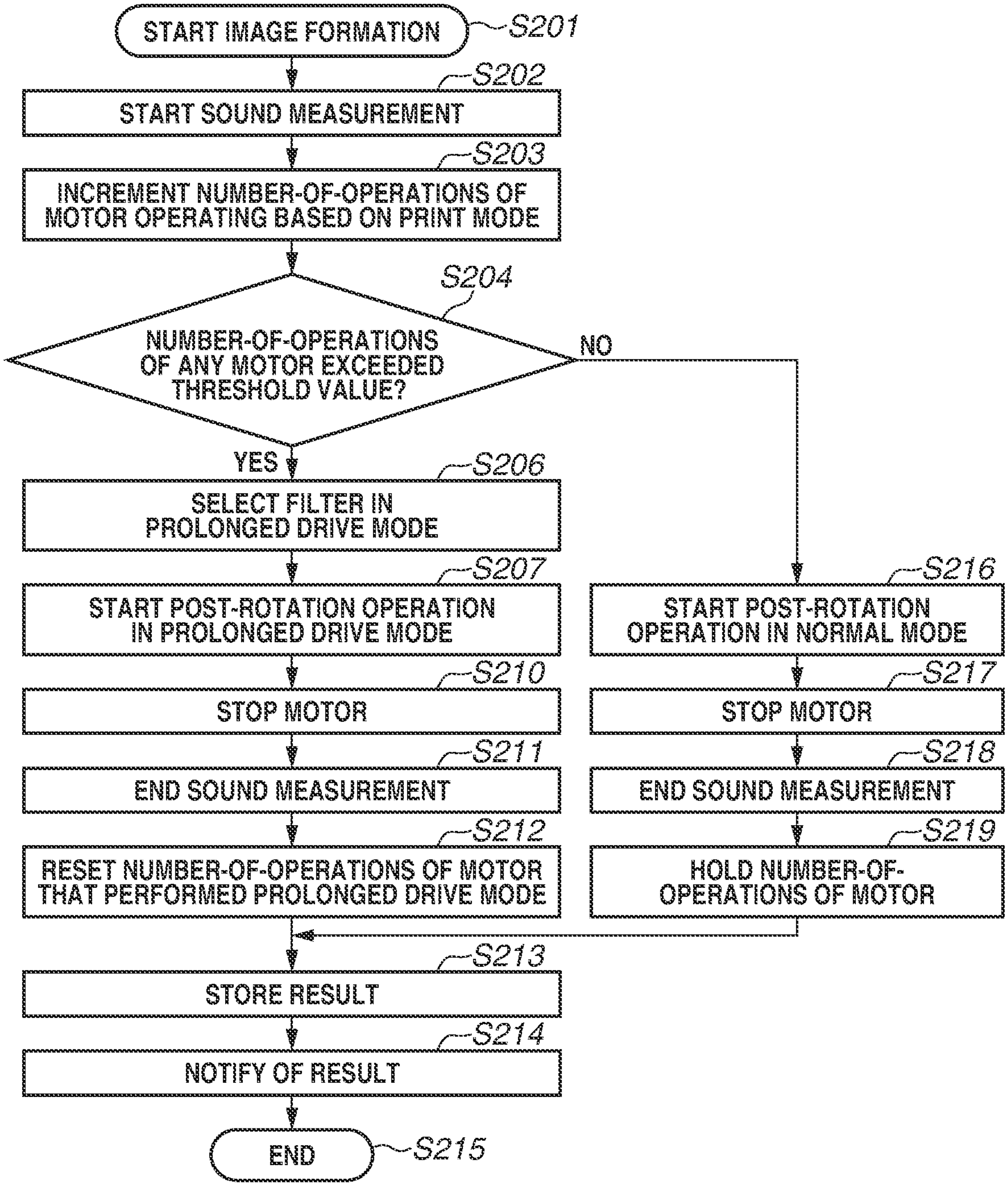
FIG. 14 is a flowchart illustrating procedures for implementing individual drive according the third exemplary embodiment.

FIG. 14 is a flowchart illustrating the implementation of the prolonged drive mode according to the present exemplary embodiment. The flowchart illustrated in FIG. 14 is implemented when the CPU 80 in the control unit 3 executes a program stored in a ROM (not illustrated).

In step S201, the CPU 80 starts the image forming operation. In step S202, the CPU 80 starts the printing sound measurement by using the sound collector 71. As described above with reference to the first exemplary embodiment, the CPU 80 can perform the printing sound measurement regardless of the prolonged drive mode. This measurement is used to detect an abnormal sound and identify the cause of the abnormal sound. In step S203, the CPU 80 increments the number of operations of the motors operating based on the print mode. When the number of operations of a motor exceeds the threshold value (YES in step S204), the processing proceeds to step S206. In steps S206 to S215, the CPU 80 implements the prolonged drive mode.

In the prolonged drive mode, in step S206, the CPU 80 selects the filter to be used by the filter calculation unit 705. In step S207, the CPU 80 starts the post-rotation operation in the prolonged drive mode and then starts the printing sound measurement for the prolonged drive mode by using the sound collector 71. More specifically, after the post-rotation operation, the CPU 80 prolongs the driving of the motor the number of operations of which exceeded the threshold value. The threshold value of the number of operations may be different for each motor. After the post-rotation operation of the target motor is prolonged, then in step S210, the CPU 80 stops the motor. In step S211, the CPU 80 completes the printing sound measurement with the sound collector 71. In step S212, the CPU 80 resets the number of operations of the motor that has been subjected to the implementation of the prolonged drive mode. Processing in steps S213 to S215 is similar to the processing in steps S115 to S117, respectively, illustrated in the flowchart in FIG. 5, and redundant descriptions thereof will be omitted.

On the other hand, when the number of operations of the motor is smaller than the threshold value (NO in step S204), the processing proceeds to step S216. In step S216, the CPU 80 starts the post-rotation operation in the normal mode instead of implementing the prolonged drive mode. When the post-rotation operation is completed, then in step S217, the CPU 80 stops each motor. In step S218, the CPU 80 completes the printing sound measurement with the sound collector 71. In step S219, the CPU 80 holds the numbers of operations of the motors. When the next print job is generated, the CPU 80 restarts counting from the numbers of operations.

As described above, according to the present exemplary embodiment, the CPU 80 counts a parameter related to the abnormal sound generation such as the mileage of each motor for each print page, and subjects a motor of which the parameter value exceeded a threshold value to the prolonged drive mode. In addition to the first and the second exemplary embodiments, this processing enables detecting an abnormal sound or a sign of abnormal sound at an earlier timing.

According to the first exemplary embodiment, the image forming apparatus 1 performs the sound analysis processing illustrated in FIGS. 9A to 9D. With the increase in the volume of data processed by the image forming apparatus 1, the processing load on the CPU 80 in the image forming apparatus 1 excessively increases, making it hard for the CPU 80 to perform the sound analysis processing. A fourth exemplary embodiment will be described below centering on an image forming system 600 for identifying the cause of an abnormal sound. The image forming system 600 includes an analysis server 300 that performs the sound analysis processing on detected sound data in lieu of the image forming apparatus 1. Also, according to the descriptions of the fourth exemplary embodiment, descriptions of portions similar to those of the first exemplary embodiment will be omitted, and only portions different from those of the first exemplary embodiment will be described below.

Figure 15:
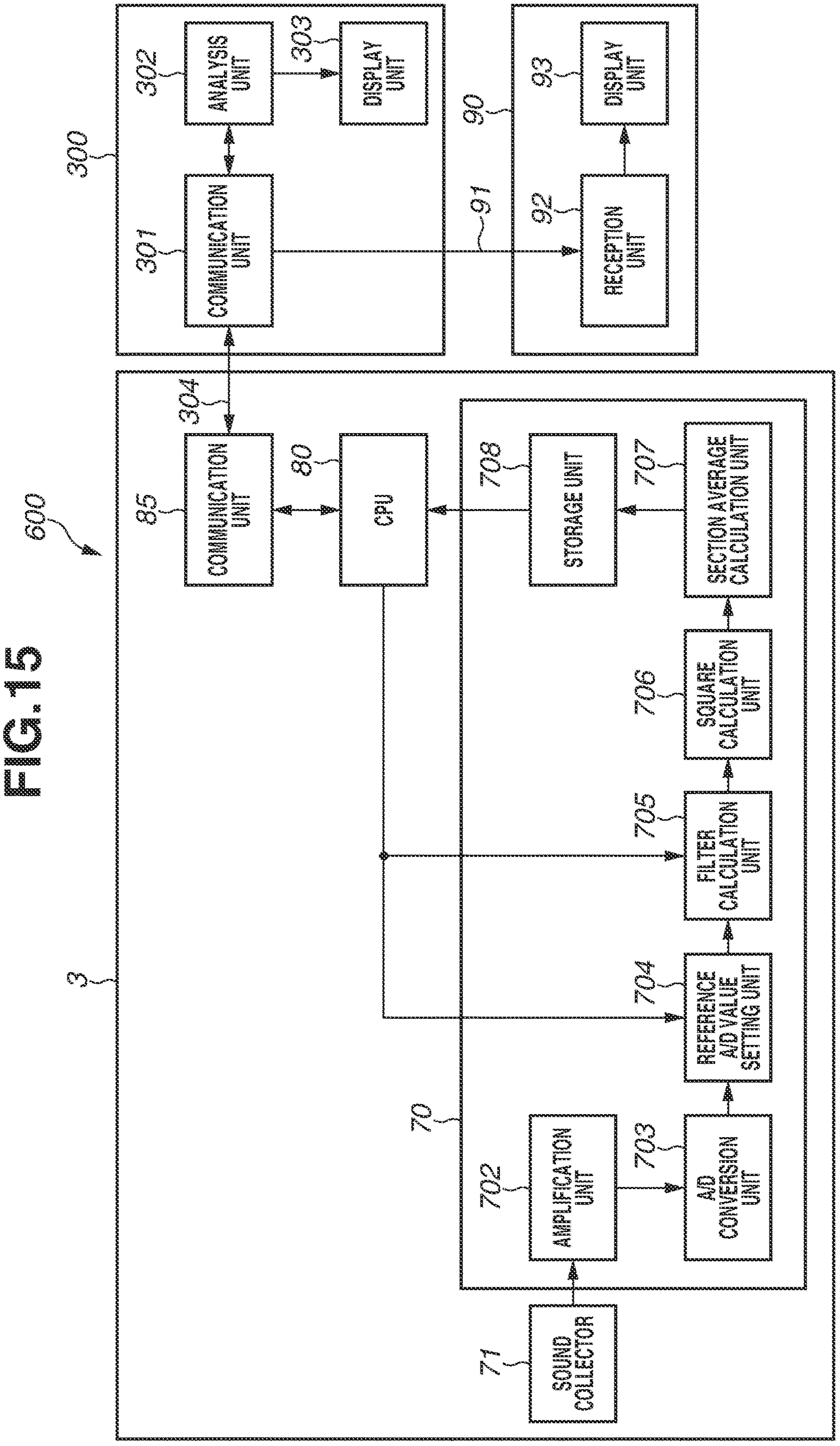
FIG. 15 is a control block diagram illustrating an image forming system according to a fourth exemplary embodiment.

FIG. 15 illustrates a configuration of the image forming system 600 according to the present exemplary embodiment. The image forming system 600 includes a control unit 3 of the image forming apparatus 1, the analysis server 300, and the management server 90.

Figure 3:
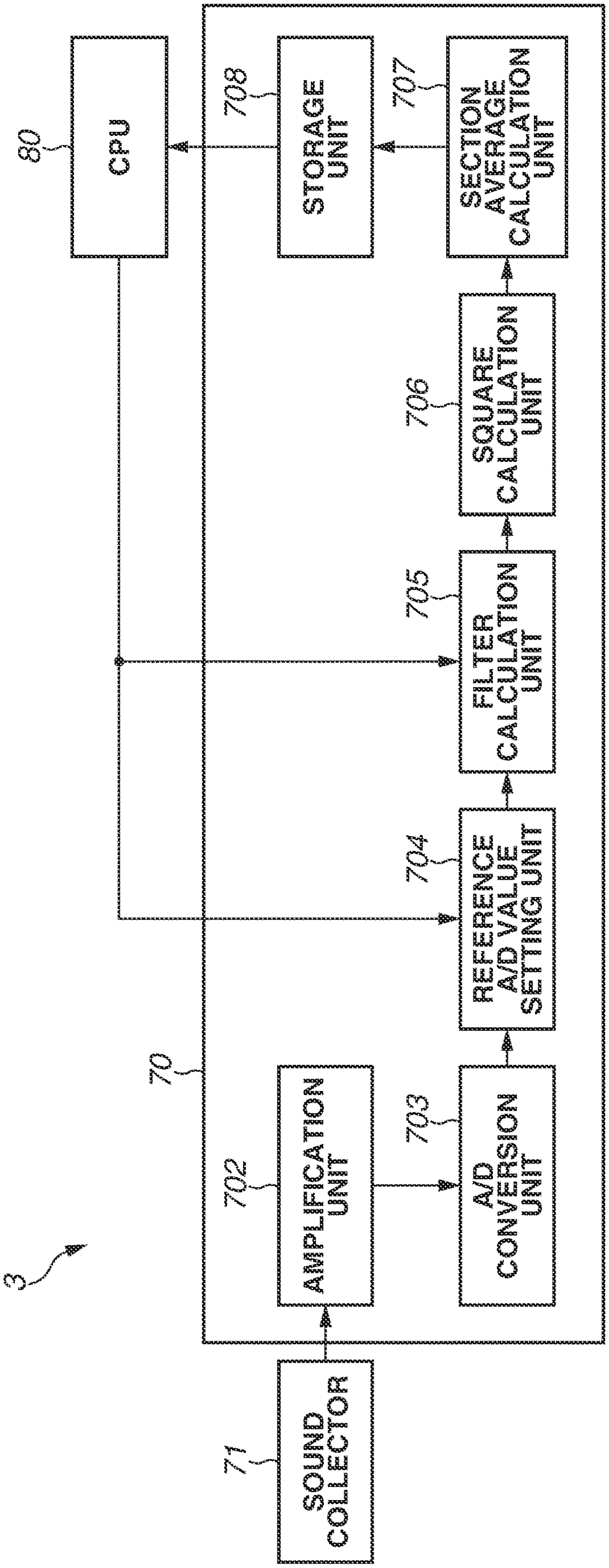
FIG. 3 is a control block diagram illustrating a configuration of a control unit according to the first exemplary embodiment.

The configuration of the control unit 3 illustrated in FIG. 15 is basically the same as that in FIG. 3. A communication unit 85 is added to the configuration in FIG. 3. The communication unit 85 transmits the sound data processed by the sound processing unit 70 to the outside analysis server 300 via a network 304. The analysis server 300 receives, via a communication unit 301, the sound data transmitted from the image forming apparatus 1, and subjects the sound data to the analysis processing by an analysis unit 302. The analysis unit 302 includes a CPU having higher performance than the CPU 80 of the image forming apparatus 1 and a large capacity memory, enabling data analysis on a larger scale. The analysis server 300 classifies the data of sound level transitions illustrated in FIGS. 9A to 9D in diverse ways, for example, in terms of the print mode, filter, and detection timing, enabling various statistical processing based on the moving average, percentile processing, and histograms. These pieces of processing enable detecting an abnormal sound generated in a particular print mode and detecting a sign of abnormal sound early through filter processing.

Then, results of these analyses are displayed on a display unit 303 of the analysis server 300 and are transmitted to the management server 90 via the network 91. Then, the display unit 93 of the management server 90 displays results of the abnormal sound diagnosis. The communication unit 301 may transmit the analysis results to the communication unit 85, and the display unit 81 (illustrated in FIG. 8) provided on the image forming apparatus 1 may display the analysis results.

In addition, based on the analysis results by the analysis server 300, the analysis server 300 may be able to issue an instruction for changing the frequency of the prolonged drive mode, the types of motors, and the filter settings in the filter calculation unit 705 to the CPU 80 of the image forming apparatus 1. For example, the analysis server 300 can instruct the image forming apparatus 1 to perform an operation for actively investigating the cause of an abnormal sound, for example, by increasing the implementation frequency of the prolonged drive mode in a print mode upon detection of a sign of abnormal sound.

Figure 16:
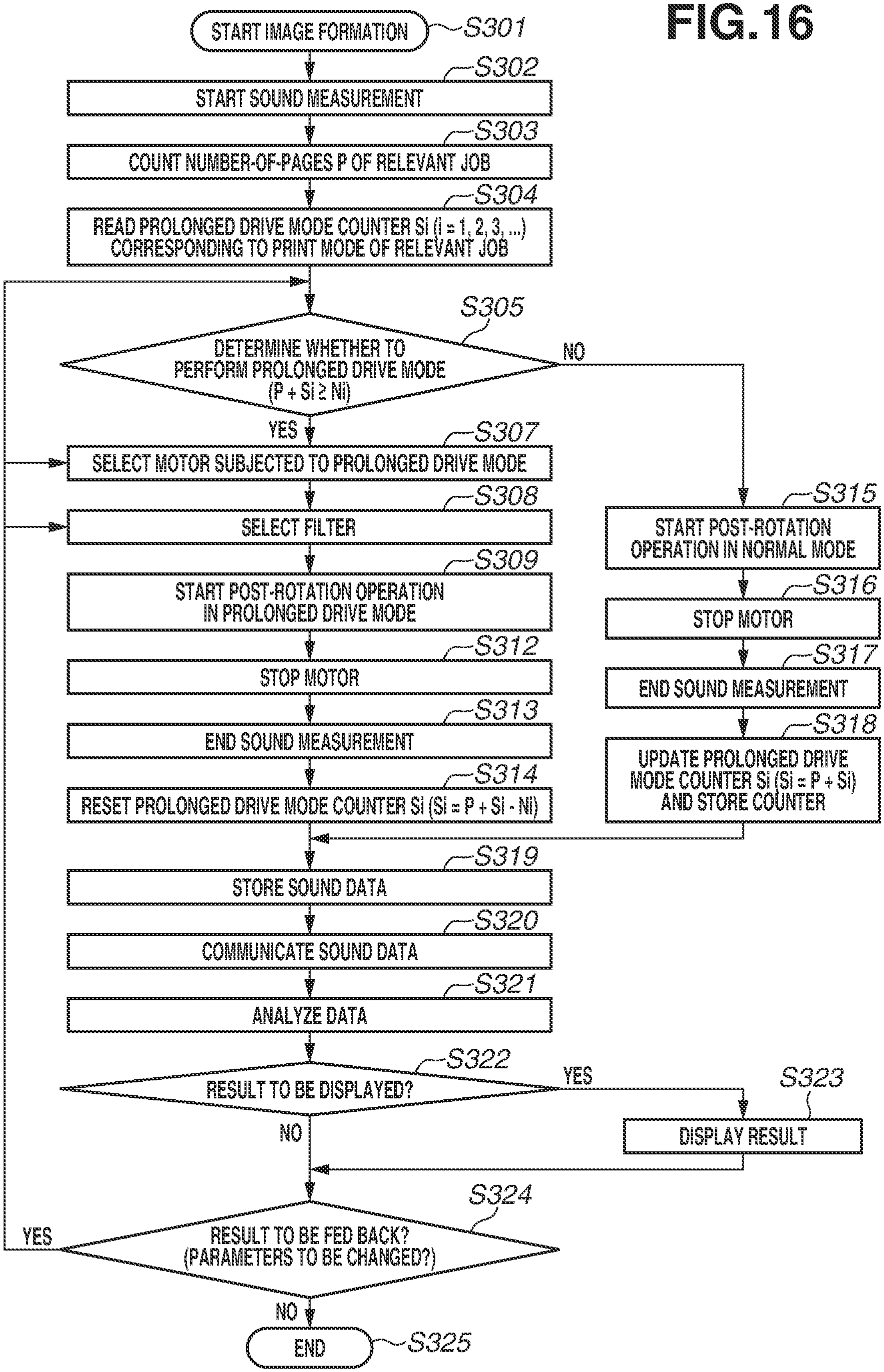
FIG. 16 is a flowchart illustrating procedures for implementing individual drive according to the fourth exemplary embodiment.

A flowchart for implementing the prolonged drive mode according to the present exemplary embodiment will be described below with reference to FIG. 16. The flowchart illustrated in FIG. 16 is implemented by the cooperation of the image forming apparatus 1, the analysis server 300, and the management server 90. More specifically, the flowchart is implemented when the CPU 80 in the control unit 3 executes a program stored in a ROM (not illustrated), and the CPUs (not illustrated) in the analysis server 300 and the management server 90 execute programs stored in a ROM (not illustrated). Processing in steps S301 to S318 is similar to the processing in FIG. 5 according to the first exemplary embodiment, and redundant descriptions thereof will be omitted. Processing in step S319 and subsequent steps will be described in detail below.

In step S319, the CPU 80 stores the sound data detected in the normal and the prolonged drive modes in the storage unit 708. The sound data refers to data having undergone the processing up to the averaging by the section average calculation unit 707 of the sound processing unit 70 in FIG. 15, and data having undergone simplified statistical processing such as averaging and percentile processing by the CPU 80. In step S320, the CPU 80 transmits these pieces of data to the analysis server 300 at required timings or at suitably set intervals, for example, several times a day.

Upon reception of the data, then in step S321, the analysis server 300 analyzes the data by various statistical processing as required. In steps S322 and S323, the results of the abnormal sound diagnosis are displayed on the image forming apparatus 1, the analysis server 300, and the management server 90 as required. In step S324, the analysis server 300 selects whether to change the parameters of the image forming apparatus 1 based on the analysis results. In this case, the analysis server 300 may automatically perform the determination, or the administrator or user may select the permission for parameter change. When an instruction for changing the parameters of the image forming apparatus 1 is issued, the analysis server 300 instructs the CPU 80 to change the threshold value Ni of the prolonged drive mode (step S305), and the motor type (step S307) and the filter type (step S308) to be subjected to the implementation of the prolonged drive mode.

As described above, according to the present exemplary embodiment, the analysis server 300 performs the analysis processing on detected sound data in lieu of the image forming apparatus 1, making it possible to handle a larger amount of data to improve the accuracy of the abnormal sound diagnosis.

Although, in the present exemplary embodiment, the sound data processed by the sound processing unit 70 is transmitted to the analysis server 300 via the network 304, the configuration is not limited thereto. If a large amount of information can be transmitted via the network 304, the sound data itself detected by the sound collector 71 may be transmitted to the analysis server 300. The analysis server 300 may be provided with a processing circuit having a function equivalent to that of the sound processing unit and configured to perform similar analysis via the analysis unit 302.

Pieces of processing of the sound processing unit 70 to be covered by the image forming apparatus 1 and pieces of processing thereof to be covered by the analysis server 300 can be suitably selected depending on the amount of information that can transmitted via the network 304, the processing capacity of the CPU 80 of the image forming apparatus 1, and the storage capacity of the storage unit 708.

Although, in the exemplary embodiment, the management server 90 is provided in addition to the analysis server 300, the management server 90 may be omitted if the administrator stands by near the analysis server 300. More specifically, the image forming system 600 according to the present exemplary embodiment can be configured only with the image forming apparatus 1 and the analysis server 300.

According to the exemplary embodiment, the sound processing unit 70 includes the amplification unit 702, the A/D conversion unit 703, the reference A/D value setting unit 704, the filter calculation unit 705, the square calculation unit 706, the section average calculation unit 707, and the storage unit 708. However, the CPU 80 may include at least one of the amplification unit 702, the A/D conversion unit 703, the reference A/D value setting unit 704, the filter calculation unit 705, the square calculation unit 706, the section average calculation unit 707, and the storage unit 708.

The present disclosure makes it possible to improve the identification accuracy for identifying a component generating an abnormal sound.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-090071, filed Jun. 2, 2022, and No. 2023-074228, filed Apr. 28, 2023, which are hereby incorporated by reference herein in their entirety.

What is claimed is:

1. An image forming system that performs an identification operation for identifying a component causing a predetermined sound, the image forming system comprising:

an image forming unit configured to form an image on a recording material;

a plurality of drive units configured to drive the image forming unit;

a sound detection unit configured to detect operation sounds of the plurality of drive units; and a control unit configured to implement a drive mode for operating at least one of the plurality of drive units and not operating other drive units, without forming an image on a recording material by the image forming unit, wherein the control unit implements the drive mode when the value of a counter reaches a threshold value, the counter being incremented with each image formation on a recording material by the image forming unit, wherein the identification operation identifies a component causing the predetermined sound based on the operation sounds detected by the sound detection unit during a period in which the drive mode is being implemented, wherein the plurality of drive units includes a first and a second drive unit, wherein, when the first drive unit operates with each image formation on a recording material by the image forming unit, the value of the first counter corresponding to the first drive unit is incremented, and wherein, when the second drive unit operates with each image formation, the value of the second counter corresponding to the second drive unit is incremented.

2. The image forming system according to claim 1, wherein, in a case where the predetermined sound is generated during a period in which the first and the second drive units are operating, the predetermined sound is generated during a period in which the drive mode for the first drive unit is being implemented, and the predetermined sound is not generated during a period in which the drive mode for the second drive unit is being implemented, a component driven by the first drive unit is identified as the cause of the predetermined sound.

3. The image forming system according to claim 1, wherein, in a case where the predetermined sound is generated during a period in which the first and the second drive units are operating, and where the predetermined sound is not generated during a period in which the drive mode for a drive unit different from the first drive unit including the second drive unit is being implemented, a component driven by the first drive unit is identified as the cause of the predetermined sound.

4. The image forming system according to claim 1, wherein, when the value of the counter reaches the threshold value, the control unit subjects the first drive unit to the drive mode implementation and resets the value of the counter, and wherein, when the value of the counter reaches the threshold value next time, the control unit subjects the second drive unit to the drive mode implementation.

5. The image forming system according to claim 4, wherein the value of the counter is the number of recording materials on which an image is formed by the image forming unit.

6. The image forming system according to claim 4, wherein the image forming system operates in a plurality of operation modes for forming an image on a recording material, and wherein a different threshold value is set for each of the plurality of operation modes.

7. The image forming system according to claim 6, wherein, in a case where the image forming system operates in a specific operation mode out of the plurality of operation modes, the control unit sets the number of times of subjecting the first drive unit to the drive mode implementation to a number greater than the number of times of subjecting the second drive unit to the drive mode implementation.

8. The image forming system according to claim 7, wherein the plurality of operation modes includes a first operation mode for forming an image on a recording material at a first rate and a second operation mode for forming an image on a recording material at a rate lower than the first rate, and wherein, in a case where the image forming system operates in the second operation mode, the control unit sets the number of times of subjecting a fixing drive unit for driving a fixing unit for fixing the image to the recording material to a number greater than the number of times of subjecting other drive units to the drive mode implementation.

9. The image forming system according to claim 1, wherein the value of the counter is the number of operations or the operation time of the drive unit when an image is formed on the recording material by the image forming unit.

10. The image forming system according to claim 1, wherein the threshold value is set based on the first and the second drive units, wherein, when the value of the first counter reaches a first threshold value, the control unit subjects the first drive unit to the drive mode implementation, and wherein, when the value of the second counter reaches a second threshold value, the control unit subjects the second drive unit to the drive mode implementation.

11. The image forming system according to claim 10, wherein the image forming system operates in a plurality of operation modes to form an image on a recording material, and wherein the different first and second threshold values are set based on the plurality of operation modes.

12. The image forming system according to claim 1, wherein the system notifies of information about the component identified as the cause of the predetermined sound.

13. The image forming system according to claim 1, wherein the image forming system includes an image forming apparatus, wherein the image forming apparatus includes the image forming unit, the plurality of drive units, the sound detection unit, and the control unit, and wherein the control unit is configured to perform the identification operation.

14. The image forming system according to claim 1, wherein the image forming system includes an image forming apparatus and one or more server apparatuses connected with the image forming apparatus via a network, wherein the image forming apparatus includes the image forming unit, the plurality of drive units, the sound detection unit, and the control unit, and wherein the server apparatuses is configured to perform the identification operation.

* * * * *